US009890623B2

(12) United States Patent
Ghorbani et al.

(10) Patent No.: US 9,890,623 B2
(45) Date of Patent: Feb. 13, 2018

(54) METHOD OF INHIBITING SCALE IN A GEOLOGICAL FORMATION

(71) Applicant: UNIVERSITY OF LEEDS, Leeds, West Yorkshire (GB)

(72) Inventors: Nasser Ghorbani, Bergen (NO); Niall Fleming, Haus (NO); Mark Wilson, Leeds (GB); Nikil Kapur, Ilkley (GB); Anne Neville, Leeds (GB)

(73) Assignee: University of Leeds, Leeds (GB)

( * ) Notice: Subject to any disclaimer, the term of this patent is extended or adjusted under 35 U.S.C. 154(b) by 35 days.

(21) Appl. No.: 14/406,404

(22) PCT Filed: Jun. 6, 2013

(86) PCT No.: PCT/GB2013/051496
§ 371 (c)(1),
(2) Date: Dec. 8, 2014

(87) PCT Pub. No.: WO2013/182852
PCT Pub. Date: Dec. 12, 2013

(65) Prior Publication Data
US 2015/0129225 A1    May 14, 2015

(30) Foreign Application Priority Data
Jun. 7, 2012    (GB) .................................. 1210034.3

(51) Int. Cl.
*E21B 43/16*    (2006.01)
*E21B 43/22*    (2006.01)
(Continued)

(52) U.S. Cl.
CPC ............... *E21B 43/16* (2013.01); *C09K 8/52* (2013.01); *C09K 8/528* (2013.01); *F24F 11/001* (2013.01);
(Continued)

(58) Field of Classification Search
CPC .... C09K 2208/10; C09K 8/516; C09K 8/665; C09K 8/5045; E21B 43/006; E21B 43/267; E21B 43/16
See application file for complete search history.

(56) References Cited

U.S. PATENT DOCUMENTS

| 3,951,827 A | 4/1976 | Burroughs et al. |
| 4,708,207 A | 11/1987 | Kalfayan et al. |

(Continued)

FOREIGN PATENT DOCUMENTS

| CN | 101503230 A | 8/2009 |
| EP | 0224346 A2 | 6/1987 |

(Continued)

OTHER PUBLICATIONS

Russian Office Action for PCT/GB2013/051496, dated Mar. 2, 2016 (4 pages), incorporating a Search Report (2 pages).

(Continued)

*Primary Examiner* — Zakiya W Bates
(74) *Attorney, Agent, or Firm* — Harness, Dickey & Pierce, P.L.C.

(57) ABSTRACT

A method of inhibiting scale in a geological formation comprising depositing a binder on the formation surface, delivering a nano-material to the surface where it chemically interacts with the binder, emplacing a scale inhibitor on the formation that is absorbed by the nano-material, where a sustained release of the scale inhibitor into the geological formation results.

17 Claims, 14 Drawing Sheets

(51) Int. Cl.
*C09K 8/528* (2006.01)
*F24F 11/00* (2006.01)
*C09K 8/52* (2006.01)

(52) U.S. Cl.
CPC ...... *F24F 11/0012* (2013.01); *F24F 11/0076* (2013.01); *F24F 11/0079* (2013.01); *C09K 2208/10* (2013.01); *F24F 2011/0041* (2013.01); *F24F 2011/0056* (2013.01); *F24F 2011/0061* (2013.01); *F24F 2011/0073* (2013.01); *Y02B 30/746* (2013.01); *Y02P 20/124* (2015.11)

(56) References Cited

U.S. PATENT DOCUMENTS

| | | | |
|---|---|---|---|
| 5,002,126 | A | 3/1991 | Carlberg et al. |
| 5,685,918 | A | 11/1997 | Tate |
| 6,401,816 | B1 | 6/2002 | Price et al. |
| 8,822,386 | B2 | 9/2014 | Quintero et al. |
| 2002/0128157 | A1 | 9/2002 | Bates et al. |
| 2006/0046937 | A1 | 3/2006 | Fu et al. |
| 2006/0124301 | A1 | 6/2006 | Gupta et al. |
| 2008/0058229 | A1 | 3/2008 | Berkland et al. |
| 2008/0132431 | A1 | 6/2008 | De Campo et al. |
| 2008/0269083 | A1 | 10/2008 | Argillier et al. |
| 2008/0277620 | A1 | 11/2008 | Kesavan et al. |
| 2009/0163389 | A1 | 6/2009 | De Campo et al. |
| 2010/0089578 | A1 | 4/2010 | Nguyen et al. |
| 2011/0028358 | A1 | 2/2011 | Welton et al. |
| 2011/0124533 | A1 | 5/2011 | Notte et al. |
| 2011/0214488 | A1 | 9/2011 | Rose et al. |
| 2012/0015852 | A1 | 1/2012 | Quintero et al. |
| 2012/0208728 | A1 | 8/2012 | Fleming et al. |
| 2012/0285690 | A1* | 11/2012 | Weaver ............... C09K 8/57 166/305.1 |
| 2014/0349894 | A1 | 11/2014 | Quintero et al. |

FOREIGN PATENT DOCUMENTS

| | | |
|---|---|---|
| GB | 1458607 A | 12/1976 |
| GB | 2417044 A | 2/2006 |
| GB | 2472921 A | 2/2011 |
| WO | WO-02/12674 A1 | 2/2002 |
| WO | WO-2004/011772 A1 | 2/2004 |
| WO | WO-2008/020220 A1 | 2/2008 |
| WO | WO-2009/027680 A1 | 3/2009 |
| WO | WO-2009/050561 A2 | 4/2009 |
| WO | WO-2009/144566 A1 | 12/2009 |
| WO | WO-2011/021043 A1 | 2/2011 |
| WO | WO-A-2011/073204 | 6/2011 |
| WO | WO-2012/009128 A2 | 1/2012 |

OTHER PUBLICATIONS

International Search Report for PCT/GB2013/051496, ISA/EP, dated Aug. 13, 2013.
International Preliminary Report on Patentability, IB, Geneva, dated Dec. 9, 2014 (8 pages), incorporating the Written Opinion of the ISA, ISA/EP, dated Aug. 13, 2013 (7 pages).
N. Kazemi, et al., Preventing Adhesion of Scale on Rock by Nanoscale Modification of the Surface, Society of Petroleum Engineers, 2012, XP-00270972.
Chinese Office Action for China Application No. 201380041474.4, dated Jul. 28, 2016 (14 pages, with English translation).

* cited by examiner

DETPMP

PPCA

METHOD OF INHIBITING SCALE IN A GEOLOGICAL FORMATION

CROSS-REFERENCE TO RELATED APPLICATIONS

This application is a 371 U.S. National Stage of International Application No. PCT/GB2013/051496, filed Jun. 6, 2013, which claims priority to British Patent Application No. GB 1210034.3, filed Jun. 7, 2012. The entire disclosures of each of the above applications are incorporated herein by reference.

The present invention relates to a method of inhibiting scale in a geological formation such as a hydrocarbon reservoir and a kit of parts for performing the method.

The production (or extraction) of hydrocarbons such as oil and natural gas from the earth is achieved by drilling a well into a geological formation known as a reservoir. It is desirable to ensure that the flow of hydrocarbon from the reservoir is not impeded during production. The flow of hydrocarbon from the reservoir is affected by the permeability of the geological formation. If the pores of the geological formation are narrowed or blocked, the flow of hydrocarbon will be reduced. Mineral scale may form in a geological formation during hydrocarbon production. Scale formation is undesirable because it may constrict the pores of the geological formation and therefore reduce the flow of hydrocarbon from the reservoir.

To prevent scale formation during production of hydrocarbons, scale inhibitors are pumped periodically into the near-wellbore region of hydrocarbon reservoirs in an operation known as a squeeze treatment. The squeeze treatment lifetime is the period after which a squeeze treatment must be repeated and is dependent on how quickly the scale inhibitors are removed from the reservoir during production.

Various methods of delivering scale inhibitors into geological formations are known. US2008/0269083 discloses the injection of nano-particles comprising an anti-scale polymer into a geological formation. The nano-particles are retained temporarily in the geological formation by mechanical retention (i.e. the nano-particles are of a size where they will be retained in the pores of the geological formation) or physical adsorption. During production of the hydrocarbon, the anti-scale polymer diffuses out of the nano-particle to inhibit the formation of scale in the geological formation.

WO2009/144566 discloses the use of an organosilane as a scale inhibition promoter to enhance the adsorption of a scale inhibitor in a geological formation. It is proposed that the organosilane enhances the adsorption of the scale inhibitor by binding together small mineral particles such as kaolinite particles in the geological formation.

The present invention is based on the recognition that adhering a nano-material to a surface (e.g. an internal surface) of a geological formation by inducing a chemical interaction between the nano-material and a binder deposited on the surface of the geological formation allows adsorption sites on the nano-material to be retained within the geological formation over a sustained period. These adsorption sites are then able to adsorb a treatment chemical such as a scale inhibitor and provide sustained release of the treatment chemical into the geological formation.

Thus viewed from a first aspect the present invention provides a method of inhibiting scale in a geological formation comprising:

(a) depositing a binder on a surface of the geological formation;

(b) delivering a nano-material to the surface of the geological formation whereby to cause adherence by a chemical interaction between the nano-material and the binder, wherein the nano-material provides one or more adsorption sites for a scale inhibitor;

(c) emplacing a quantity of the scale inhibitor in the geological formation so that an amount of the scale inhibitor is adsorbed by the nano-material; and (d) inhibiting scale in the geological formation by sustained release of the amount of the scale inhibitor from the nano-material into the geological formation.

An advantage of the method of the present invention is that the chemical interaction between the binder and the nano-material prolongs the retention of the adsorption sites on the nano-particles within the geological formation. This means that a treatment chemical emplaced in the geological formation which is adsorbed by the nano-material will exhibit sustained release into the geological formation. This may improve the effectiveness of the scale inhibitor by prolonging its presence in the geological formation. This serves to enhance, restore or maintain the productivity of the hydrocarbon reservoir (e.g. by maintaining or improving the flow of produced hydrocarbon from the reservoir).

Once the amount of the scale inhibitor has been released into the geological formation, a second quantity of the scale inhibitor may be emplaced in the geological formation to advantageously re-use the adsorption sites provided by the nano-material.

The geological formation may be porous. The geological formation may include internal capillaries or pores. The surface of the geological formation may be an internal surface. A pore may vary in diameter along its length. Typically a pore may vary in diameter from about 5 µm to about 20 µm along its length.

The geological formation may include mica, quartz or doddington rock. The surface of the geological formation may include hydroxyl groups.

The geological formation may be a part of a hydrocarbon reservoir. Typically the geological formation is a near-wellbore region of a hydrocarbon reservoir.

The fluid environment within the pores of the geological formation may include hydrocarbon and/or brine.

Typically the binder is pumped into the geological formation. The binder may be pumped into the geological formation via a well. The well may be a production well or an injection well.

The binder may be carried (for example, dissolved, dispersed or suspended) in a binder carrier fluid. The binder carrier fluid may comprise ethanol and water. The binder carrier fluid may comprise toluene. The binder carrier fluid may be a solution of 95% ethanol to 5% water by volume. The concentration of the binder in the binder carrier fluid may be up to 10 wt %, preferably up to 2 wt %. The concentration of the binder in the binder carrier fluid may be from 0.1 wt % to 2 wt %.

The surface of the geological formation may be porous. The binder may interact with the surface. Typically the binder will chemically interact with the surface.

The binder may bond to the surface of the geological formation. The bond may be a chemical bond. The bond may be an ionic bond, a hydrogen bond or a Van der Waals bond. Typically the bond is a covalent bond. The bond may be a silicon-oxygen (Si—O) bond. The binder may bond to a hydroxyl group on the surface. The binder may bond to the surface via a silicon-oxygen-silicon (Si—O—Si) bond. An Si—O—Si bond may be advantageously resistant to the fluid environment within the pores of a geological formation.

The binder may include a silicon atom. The binder may be silicon based. The binder may be a silane. Typically the binder is an organo-silane. The binder may comprise at least one carbon-silicon bond.

The binder may be an alkoxy-silane. The binder may comprise at least one alkoxy group. The alkoxy group may be a methoxy group or an ethoxy group. The alkoxy group may react with the surface of the geological formation to covalently bond the binder to the surface. The alkoxy group may react with a hydroxyl group on the surface of the geological formation. Use of an alkoxy-silane binder may advantageously allow the binder to form Si—O—Si bonds with the surfaces of geological formations which have a range of mineral compositions.

The binder may include a nitrogen atom. The binder may be an amino-silane. The binder may comprise at least one amino group. The amino group may chemically interact with the nano-material. The binder may be a primary or secondary amine. Preferably the binder is a primary amine.

The binder may comprise at least one diazo group. The binder may be a diazonium salt.

The binder may comprise at least one carboxyl group. The carboxyl group may chemically interact with the nano-material.

The binder may be an alkoxy-amino-silane. The binder may comprise at least one alkoxy group and at least one amino group. The binder may be selected from the group consisting of 3-aminopropyltriethoxysilane, p-aminophenyltrimethoxysilane, 3-aminopropylmethoxysilane, 4-aminobutyltriethoxysilane, m-aminophenyltrimethoxysilane, aminophenyltrimethoxysilane, 11-aminoundecyltriethoxysilane and 2-(4-pyridylethyl)triethoxysilane.

Preferably the binder is (or includes) 3-aminopropyltriethoxysilane. The binder may be (or include) p-aminophenyltrimethoxysilane.

The binder may include ethyl undecylenate.

The deposition of the binder on the surface of the geological formation may functionalise the surface. For example, when the binder is an alkoxy-amino-silane, the alkoxy group may bond to the surface and the amino group may amino-functionalise the surface. This may allow a chemical interaction with the nano-material and causes the nano-material to adhere to the surface of the geological formation.

If the binder comprises a carboxyl group the carboxyl group may carboxyl-functionalise the surface of the geological formation. This may allow the surface to chemically interact with the nano-material and adhere the nano-material to the surface of the geological formation.

Typically the nano-material is carbon based. The nano-material may comprise at least 50% carbon atoms by number, preferably at least 60% carbon atoms by number, more preferably at least 70% carbon atoms by number, particularly preferably at least 80% carbon atoms by number. The nano-material may comprise at least 90% carbon atoms by number or at least 95% carbon atoms by number.

The nano-material may comprise nano-particles. The nano-particles may provide the one or more adsorption sites.

The nano-particles may have a linear dimension in the range 0.5 nm to 2000 nm. The linear dimension may be measured in any linear direction. Preferably the nano-particles have a linear dimension in the range 0.5 nm to 1000 nm, more preferably in the range 0.5 nm to 500 nm, particularly preferably in the range 0.5 nm to 250 nm, especially preferably in the range 0.5 nm to 100 nm.

The longest linear dimension of a nano-particle may be up to 2000 nm. A nano-particle longer than 2000 nm may begin to impede flow in a pore of the geological formation. Typically the longest linear dimension of a nano-particle is up to 1500 nm, preferably up to 1000 nm, more preferably up to 500 nm.

The nano-particles may vary in size. The nano-particles may have a particle size distribution. Typically, 50% or more of the nano-particles by number have a linear dimension in the range from 0.5 nm to 2000 nm. Preferably, 75% or more of the nano-particles by number have a linear dimension in the range from 0.5 nm to 2000 nm. 90% or more of the nano-particles by number may have a linear dimension in the range from 0.5 nm to 2000 nm The shape of the nano-particles may be selected from the group consisting of a tube, a wire, a sheet or a spheroid. The nano-particles may be carbon nano-tubes (CNTs), carbon nano-wires, fullerenes or graphene. Preferably the nano-material includes one or more of the group consisting of nanotubes, nanowires, fullerenes and graphene.

Preferably the nano-particles are carbon nano-tubes. The carbon nano-tubes may be single-walled carbon nano-tubes. The carbon nanotubes may be multi-walled carbon nano-tubes. The carbon nano-tubes may be a mixture of single-walled carbon nano-tubes and multi-walled carbon nano-tubes. Preferably the nano-particles are multi-walled carbon nano-tubes The nano-material may include chemical functional groups. Each nano-particle may include one or more functional groups. The functional groups may chemically interact with the binder. The functional groups may form a chemical bond with the binder. The bond may be an ionic bond, a hydrogen bond or a Van der Waals bond. Typically the bond is a covalent bond. The functional groups may be carboxyl groups. The nano-particles may be carboxyl-functionalised nano-particles. The functional groups may be amino groups. The nano-particles may be amino-functionalised nano-particles. The functional groups may be hydroxyl functional groups. The nano-particles may be hydroxyl-functionalised nano-particles.

Typically the nano-material is pumped into the geological formation. The nano-material may be pumped into the geological formation via a production well or an injection well.

The nano-material may be carried (for example, dissolved, dispersed or suspended) in a nano-material carrier fluid which is emplaced in the geological formation. The concentration of the nano-material in the nano-material carrier fluid may be up to 20 wt %, preferably up to 10 wt %, more preferably up to 5 wt %. The concentration of the nano-material in the nano-material carrier fluid may be up to 1 wt % or up to 0.2 wt %.

The nano-material carrier fluid may include a dispersant to disperse the nano-material.

The dispersant may be dimethylformamide (DMF—see FIG. 1). The dispersant may be sodium dodecyl sulfate (SDS—see FIG. 2). The dispersant may prevent the nano-particles from agglomerating. SDS may advantageously be less damaging to the fluid environment within the geological formation than DMF. The dispersant may be BtOH (1H-benzotriazol-1-ol), Sodium dodecylbenzenesulfonate (SDBS), dimethyl sulfoxide (DMSO) or dodecyltrimethylammonium bromide (DATB).

The nano-material carrier fluid may include a linking agent. The linking agent may promote the chemical interaction between the nano-material and the binder. The linking agent may be a carbodiimide. The linking agent may be N,N'-dicyclohexylcarbodiimide (DCC) or 1-ethyl-3-(3-dimethylaminopropyl)-carbodiimide (EDC). The linking agent may be acetonitrile or isoamyl nitrite.

In an embodiment, DMF is the dispersant and DCC and EDC are the linking agents. In another embodiment, SDS is the dispersant and EDC is the linking agent.

The nano-material carrier fluid may include a cross-linking promoter. The cross-linking promoter may be hydroxysulfosuccinimide (sulfo-NHS).

Typically the chemical interaction between the nano-material and the binder is a chemical bond. Preferably the chemical bond between the nano-material and the binder is an amide bond. An amide bond may be advantageously resistant to the fluid environment within the pores of a geological formation.

An amide bond between the nano-material and the binder may be formed by the reaction of a carboxyl group on one of the nano-material or binder and an amino group on the other of the nano-material or binder. Preferably an amide bond between the nano-material and the binder is formed by the reaction of a carboxyl group on the nano-material and an amino group on the binder.

The linking agent may promote the formation of a chemical bond between the nano-material and the binder. Preferably the linking agent promotes the formation of an amide bond between the nano-material and the binder.

The cross-linking promoter may promote cross-linking between the nano-material and the binder.

The chemical interaction between the nano-material and the binder may occur in 2 days or less. Preferably the chemical interaction between the nano-material and the binder occurs in 1 day or less, more preferably in 12 hours or less, particularly preferably in 6 hours or less.

The scale inhibitor may be emplaced in the geological formation via a production well or an injection well. Typically the scale inhibitor is pumped into the geological formation The scale inhibitor may be part of a treatment fluid which is emplaced in the geological formation. The concentration of the scale inhibitor in the treatment fluid may be up to 20 wt %, preferably up to 10 wt %. The concentration of the scale inhibitor in the treatment fluid may be up to 5 wt % or up to 1 wt %.

The scale inhibitor may be chosen from those known by a person skilled in the art to be suitable for use in a hydrocarbon reservoir. The scale inhibitor may be a chemical which is capable of delaying, inhibiting or preventing scale formation in the geological formation. The scale inhibitor may be emplaced in the geological formation as part of a scale squeeze treatment.

The scale inhibitor may include a phosphorous atom. The scale inhibitor may include one or more phosphorous-oxygen double bonds. The scale inhibitor may include one or more phosphono groups.

The scale inhibitor may be based on phosphonic acid, carboxylic acid, succinic acid, aspartic acid, acrylic acid, maleic acid or mellitic acid. Preferably the scale inhibitor is based on phosphonic acid.

The scale inhibitor may include polyphosphinocarboxylic acid (PPCA), diethylenetriamine-penta-methylene phosphonic acid (DETPMP), amino-tri(methylene-phosphonic)acid (ATMP), 2-phosphonobutane-1,2,4-tricarboxylic acid (PBTC), polyepoxysuccinic acid, poly-alpha, beta-D, L-aspartate, an acrylic acid—vinyl sulphonate co-polymer, polymaleic acid, a maleic acid—vinyl sulfonate co-polymer or mellitic acid.

Preferably the scale inhibitor is PPCA or DETPMP.

When a quantity of the scale inhibitor is emplaced in the geological formation, an amount of the scale inhibitor is adsorbed by the nano-material. The adsorption may be physisorption. The adsorption may be chemisorption.

The nano-particles provide one or more adsorption sites for the scale inhibitor. Typically the adsorption sites are located on the surfaces of the nano-particles. Each nano-particle may provide one or more adsorption sites. A defect in the surface of a nano-particle may provide an adsorption site. The nano-particles may include one or more defects. A defect may be a dislocation or a kink in the surface of the nano-particle. A defect may be caused by an impurity in the nano-particle or by a lower quality of production of the nano-particle. The use of defective nano-particles is advantageous because they provide more adsorption sites than higher quality nano-particles and are generally cheaper.

It may be desirable that the scale inhibitor is adsorbed quickly by the nano-material. This is because emplacing the scale inhibitor in the geological formation may require shutting down a well in the geological formation to allow the scale inhibitor to be 'shut in' the geological formation. Costs are incurred in shutting down a well due to the cost of the operation and the loss of production during the shut down.

Preferably, step (c) of the method comprises the sub-steps:
(c)(i) pumping the quantity of the scale inhibitor into the geological formation via a well;
(c)(ii) shutting in the well until the amount of the scale inhibitor is adsorbed by the nano-material; and
(c)(iii) re-opening the well.

Adsorption of the amount of the scale inhibitor on the nano-material may take less than 1 day. Typically the adsorption of the amount scale inhibitor on the nano-material takes up to 12 hours, preferably up to 6 hours, more preferably up to 2 hours.

An equilibrium may be reached when the amount of the scale inhibitor is adsorbed on the nano-material. When the nano-material comprises carbon nano-tubes and the scale inhibitor is PPCA, adsorption of the PPCA may have reached equilibrium within 1 hour.

Once adsorption of the scale inhibitor on the nano-material has reached equilibrium, the well may be re-opened. The concentration of the scale inhibitor in the fluid environment within the pores of the geological formation may reduce due to fluid flow through the geological formation and the scale inhibitor may begin to desorb from the nano-material due to this change in concentration. Due to the adsorption forces between the scale inhibitor and the nano-material, the scale inhibitor will exhibit sustained release into the geological formation.

Core Flooding is a standard test to measure rock permeability and the flow of fluid through a rock core sample. The results of a coreflood test provide an indication of the behaviour of a geological formation in situ in a hydrocarbon reservoir. Coreflood results in relation to fluid flow through the core sample may be expressed in terms of multiples of the total volume of the pores in the core sample. For example, a fluid flow of 1 pore volume may be equivalent to the fluid in the core sample being replaced once.

The scale inhibitor may exhibit sustained release into the geological formation during the flow of a volume of fluid through the geological formation. Scale inhibitor adsorbed onto the nano-material may be released into the geological formation for more pore volumes of fluid flow through the geological formation than scale inhibitor adsorbed directly onto the surface of the geological formation (i.e. scale inhibitor adsorbed onto the nano-material may exhibit sustained release when compared with scale inhibitor adsorbed directly onto the surface of the geological formation).

The scale inhibitor may exhibit sustained release into the geological formation for more than 20, 40, 60, 80 or 100 pore volumes of fluid flow through the geological formation.

Typically, the scale inhibitor exhibits sustained release into the geological formation for more than 200 pore volumes of fluid flow through the geological formation, preferably for more than 500 pore volumes of fluid flow through the geological formation, more preferably for more than 1000 pore volumes of fluid flow through the geological formation. The scale inhibitor may exhibit sustained release into the geological formation for more than 2000 or 5000 pore volumes of fluid flow through the geological formation.

The calculation of the number of pore volumes of fluid flow through the geological formation may be based on an average pore volume per unit volume of the geological formation.

The chemical interaction between the nano-material and the binder may allow the nano-material to remain in the geological formation on a more than temporary basis. An amount of the nano-material may remain in the geological formation on a permanent basis.

After step (d) of the method has been performed, the concentration of scale inhibitor in the geological formation may drop below an acceptable level. Advantageously, an amount of the nano-material may remain in the geological formation. A second quantity of the scale inhibitor may then be emplaced in the geological formation so that a second amount of the scale inhibitor is adsorbed by the nano-material.

The method may further comprise the step of:
(e) emplacing a further quantity of the scale inhibitor in the geological formation so that a further amount of the scale inhibitor is adsorbed by the nano-material.

The further quantity of the scale inhibitor may vary. The further quantity of the scale inhibitor may be a second quantity. The further quantity of the scale inhibitor may be the same as the quantity defined in step (c) or it may be different.

The further amount of the scale inhibitor may vary. The further amount of the scale inhibitor may be a second amount. The further amount of the scale inhibitor may be the same as the amount defined in step (c) or it may be different.

The method may further comprise the step of:
(f) inhibiting scale in the geological formation by sustained release of the further amount of the scale inhibitor from the nano-material into the geological formation.

Multiple emplacements of the scale inhibitor may be performed. Steps (e) and (f) may be repeated at least once.

Viewed from a second aspect the present invention provides a kit of parts for performing a method according to the invention as described herein, the kit of parts comprising:
a binder;
a nano-material capable of adhering to the binder by a chemical interaction between the nano-material and the binder wherein the nano-material provides one or more adsorption sites; and
a scale inhibitor capable of adsorbing to the adsorption sites on the nano-material.

The components of the kit of parts may incorporate any of the general or specific features described herein with reference to the method of the present invention.

For example, the binder may be carried (e.g. dissolved, dispersed or suspended) in a binder carrier fluid. The concentration of the binder in the binder carrier fluid may be up to 10 wt %, preferably up to 2 wt %. The concentration of the binder in the binder carrier fluid may be from 0.1 wt % to 2 wt %.

As a further example, the nano-material may carried (e.g. dissolved, dispersed or suspended) in a nano-material carrier fluid. The concentration of the nano-material in the nano-material carrier fluid may be up to 20 wt %, preferably up to 10 wt %, more preferably up to 5 wt %. The concentration of the nano-material in the nano-material carrier fluid may be up to 1 wt % or up to 0.2 wt %.

An embodiment of the invention will now be described by way of example only with reference to the accompanying drawings in which.

Figure 6A:
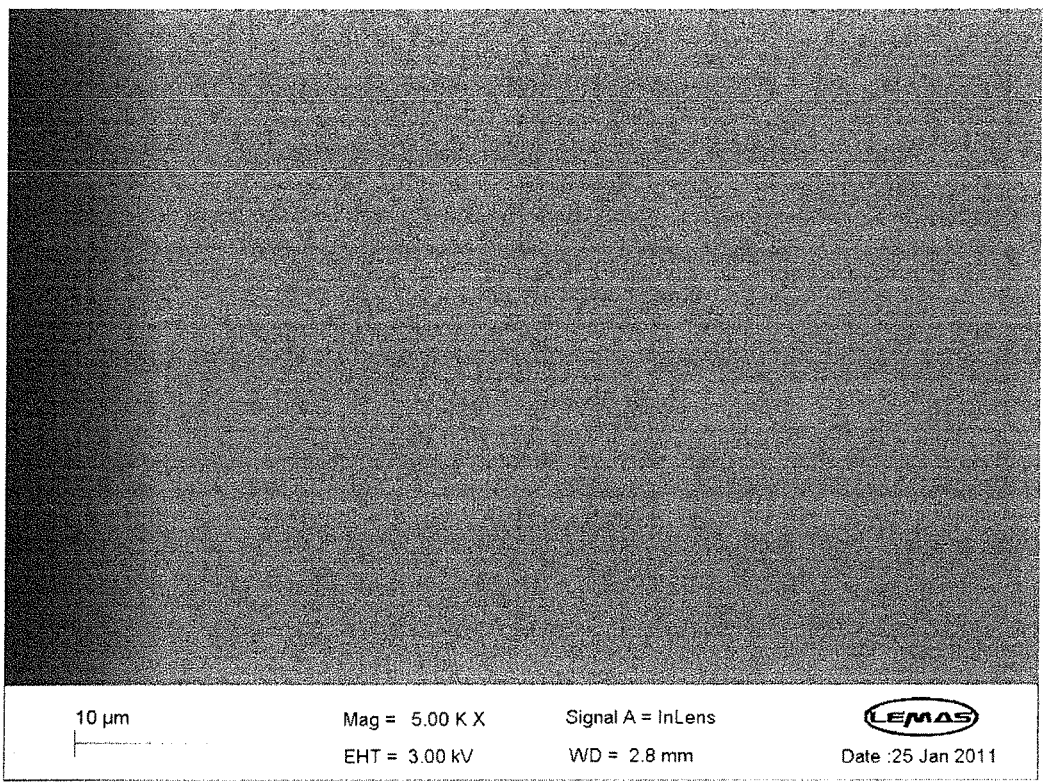
Figure 6B:
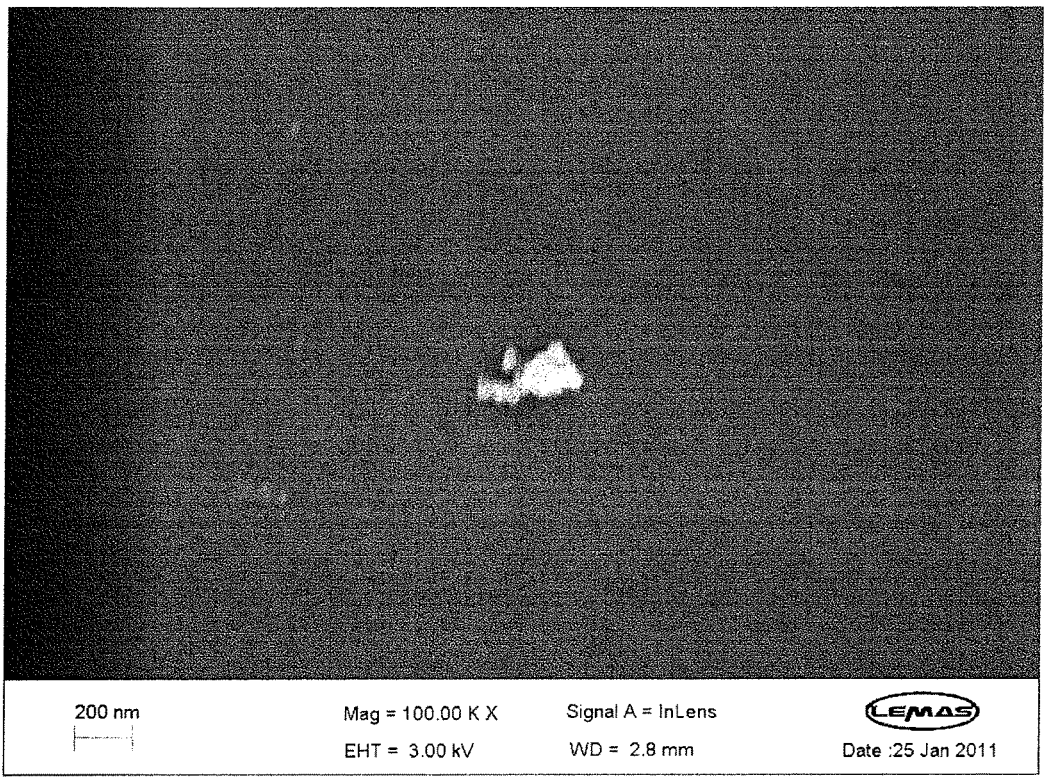
Figure 6C:
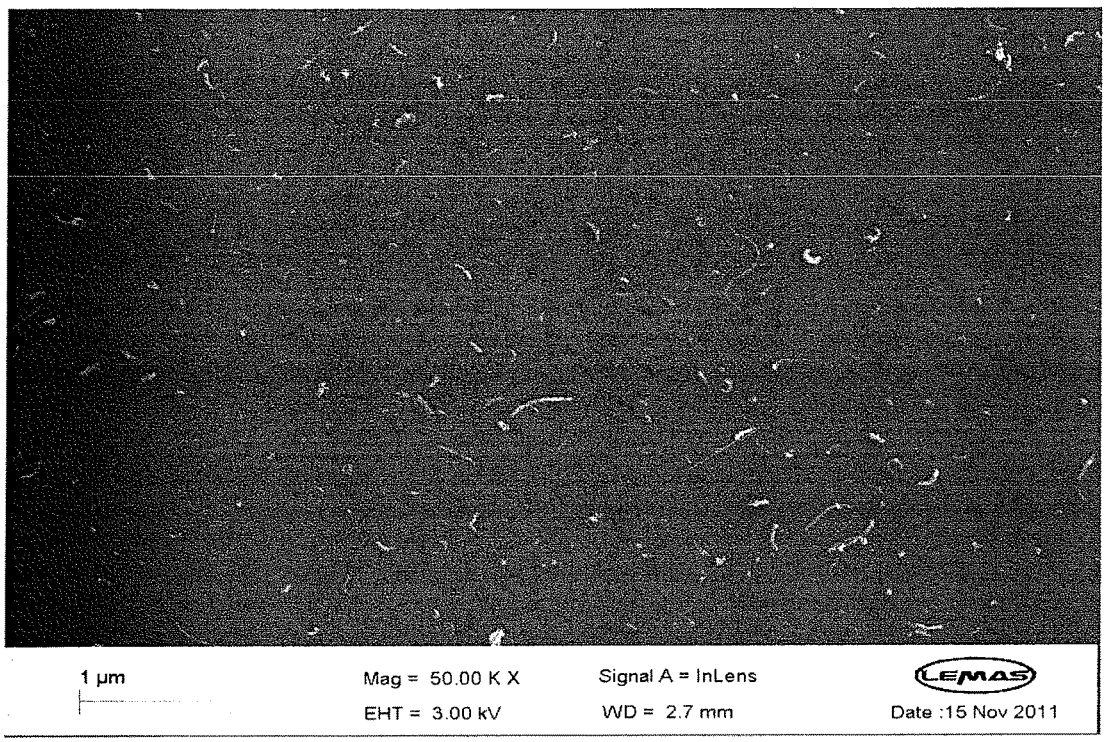
Figure 6D:
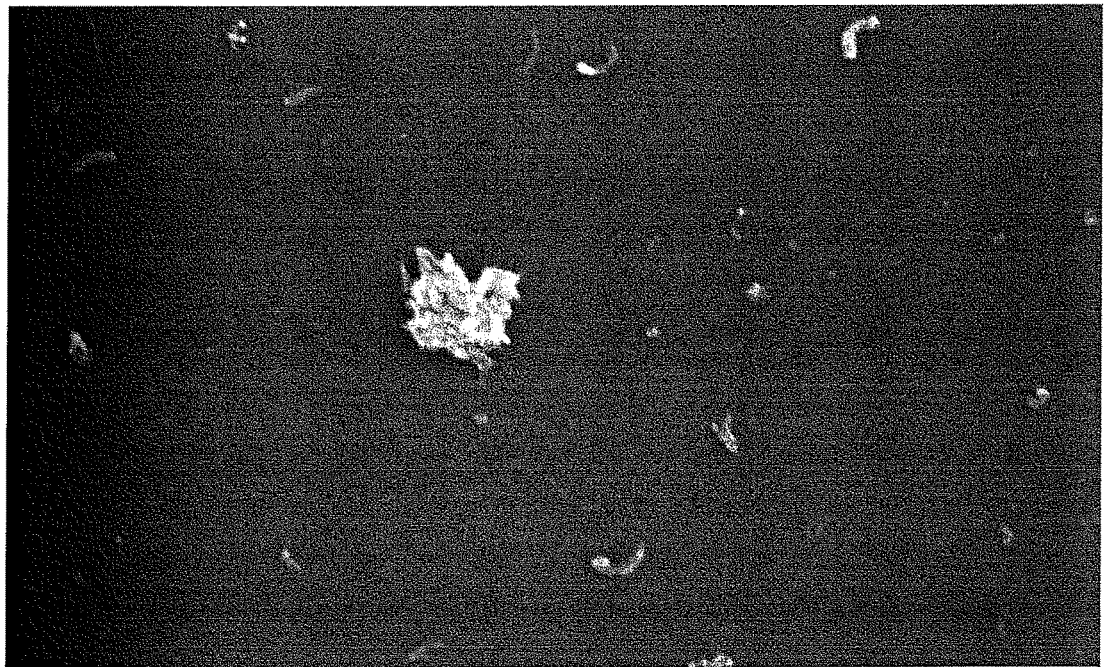
Figure 6E:
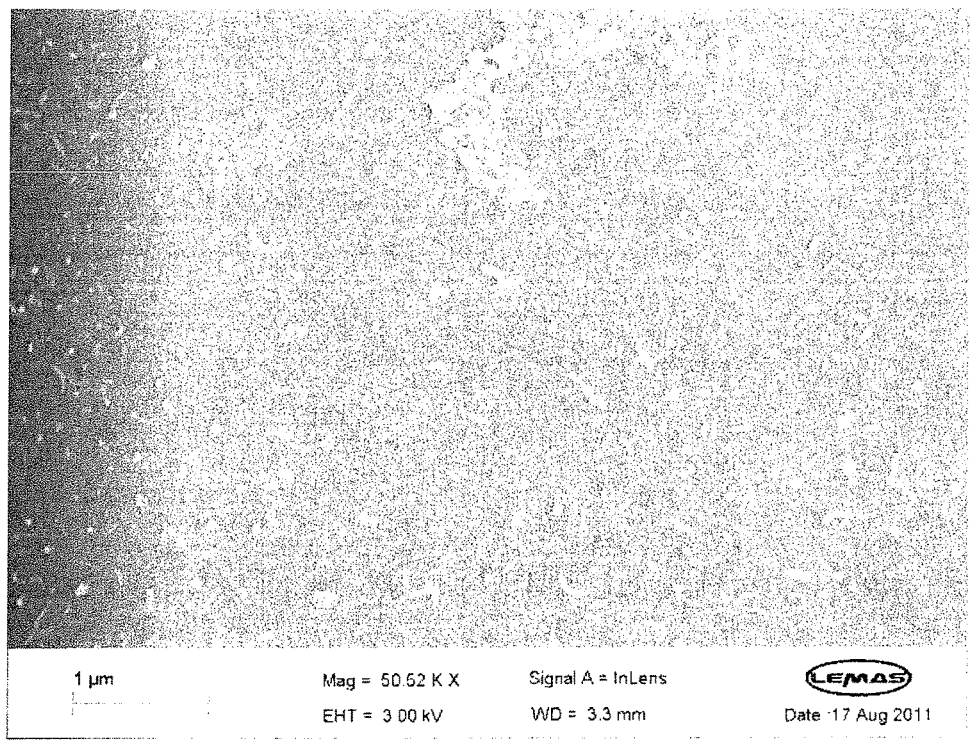
Figure 6F:
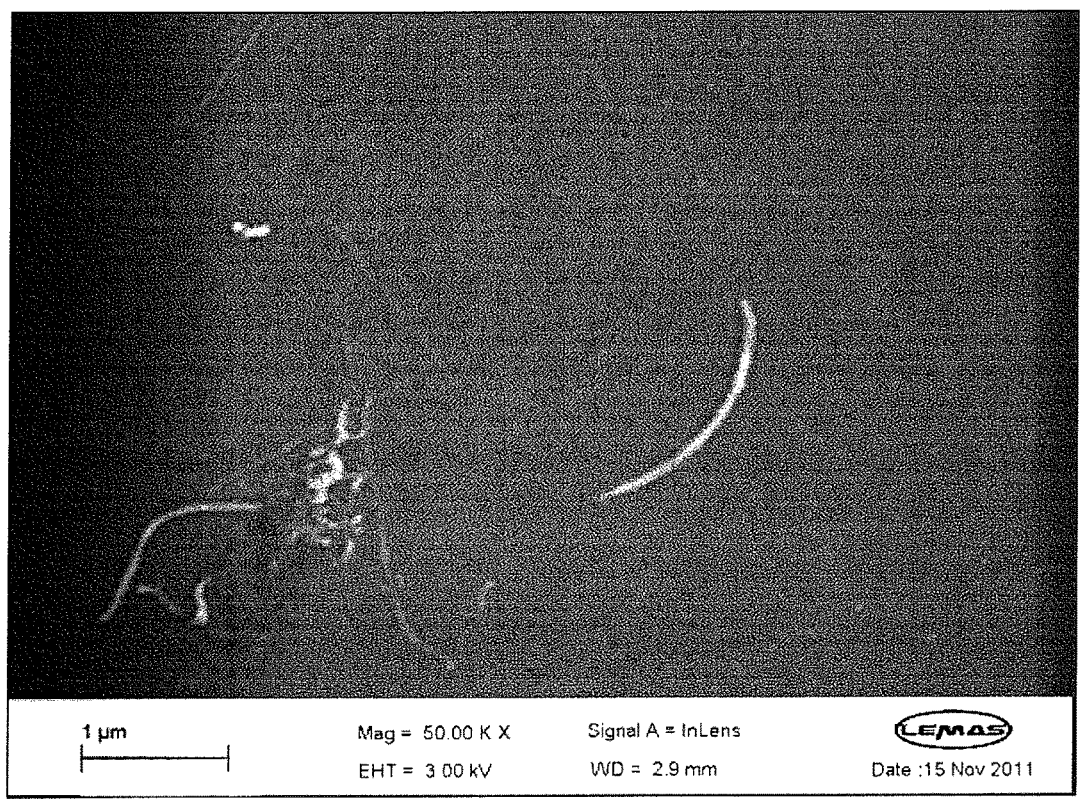
Figure 7A:
Figure 7B:
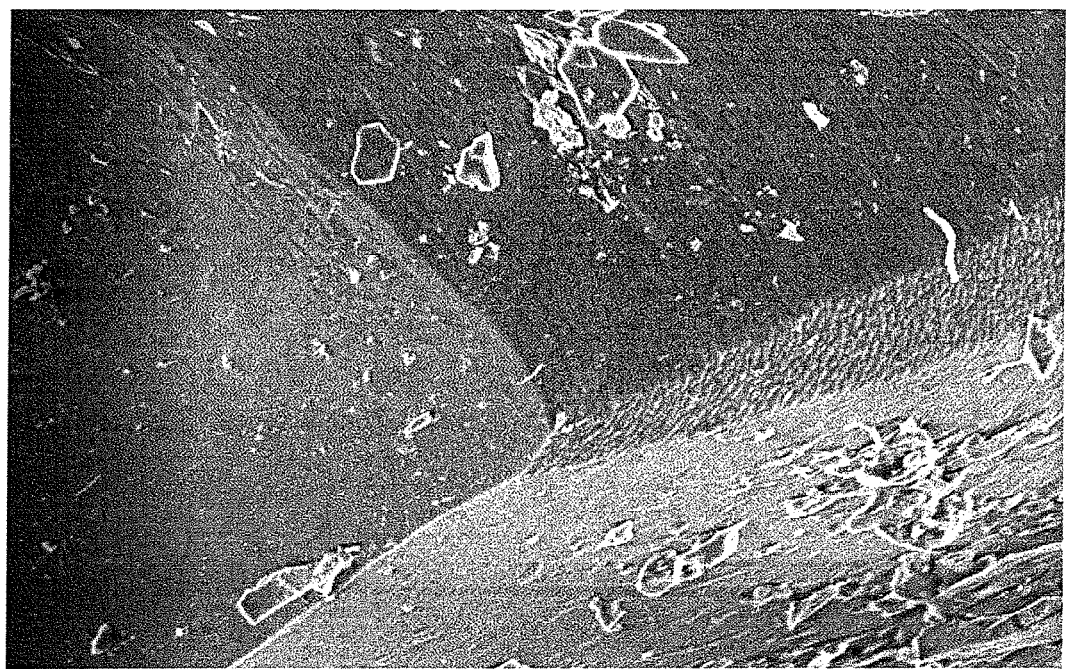
Figure 8:
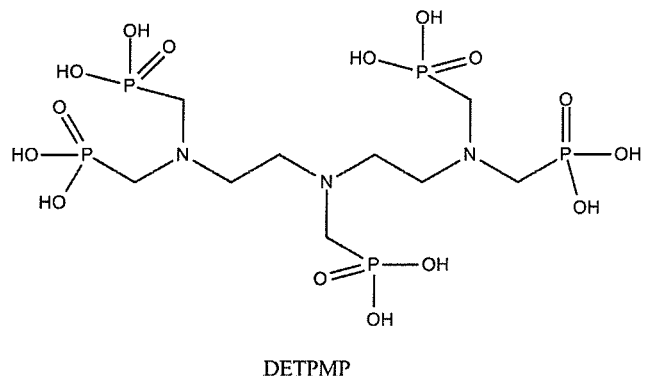
Figure 8:
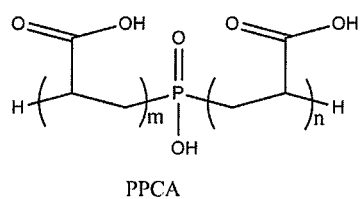
Figure 9:
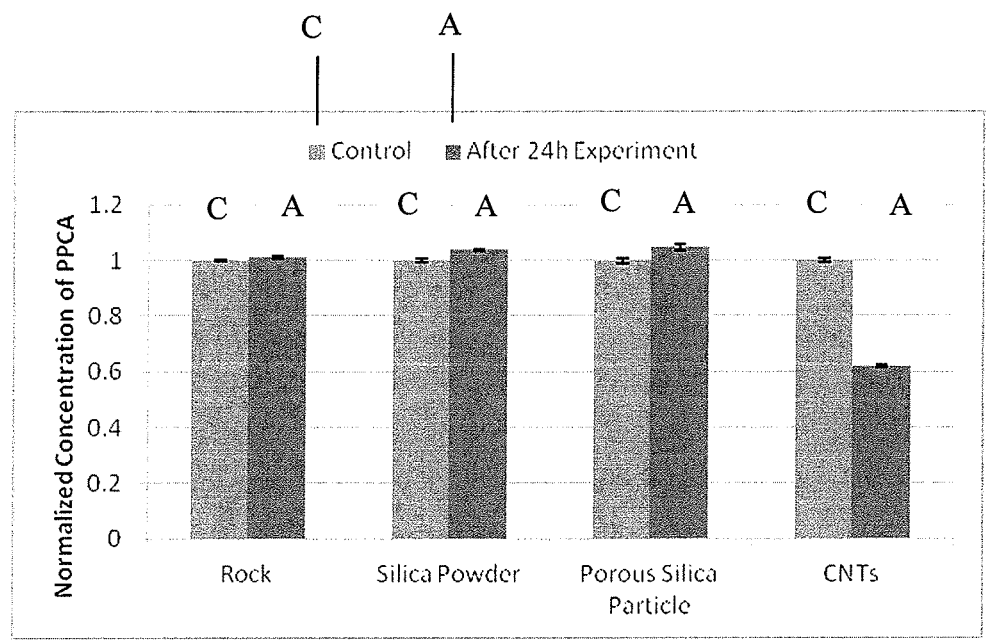
Figure 10:
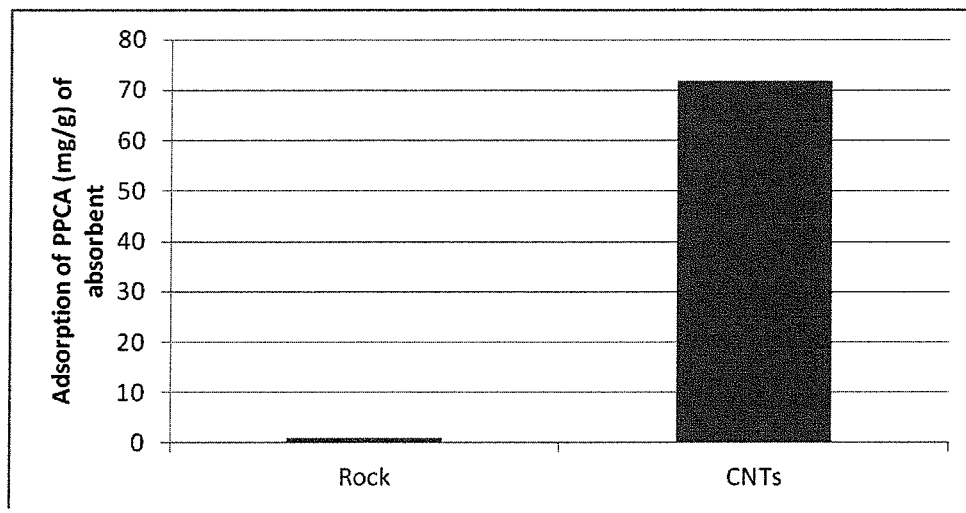
Figure 11:
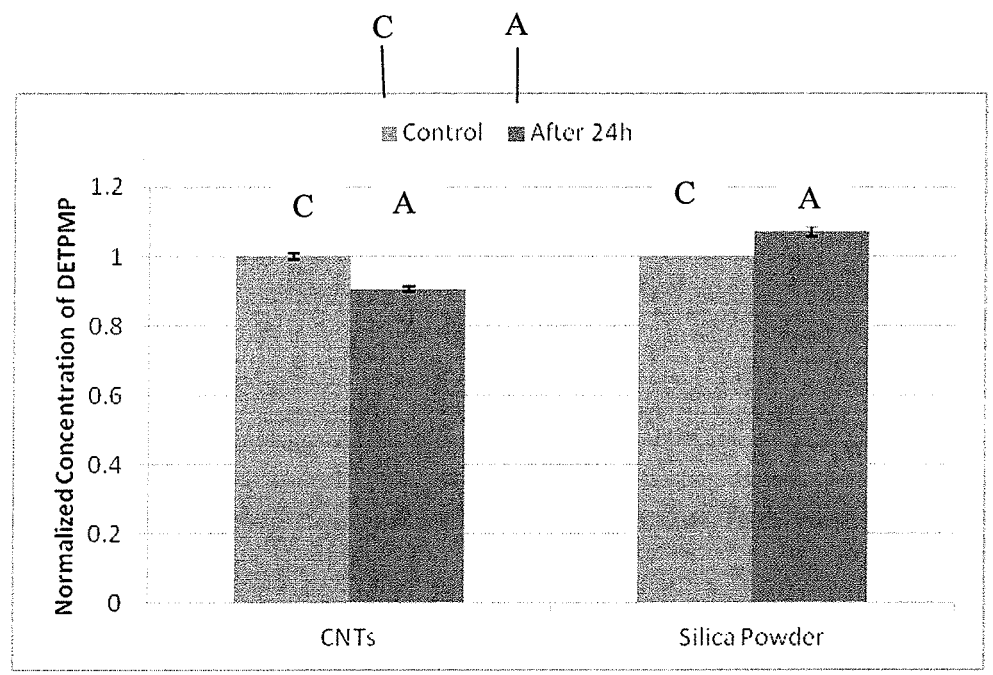
Figure 12:
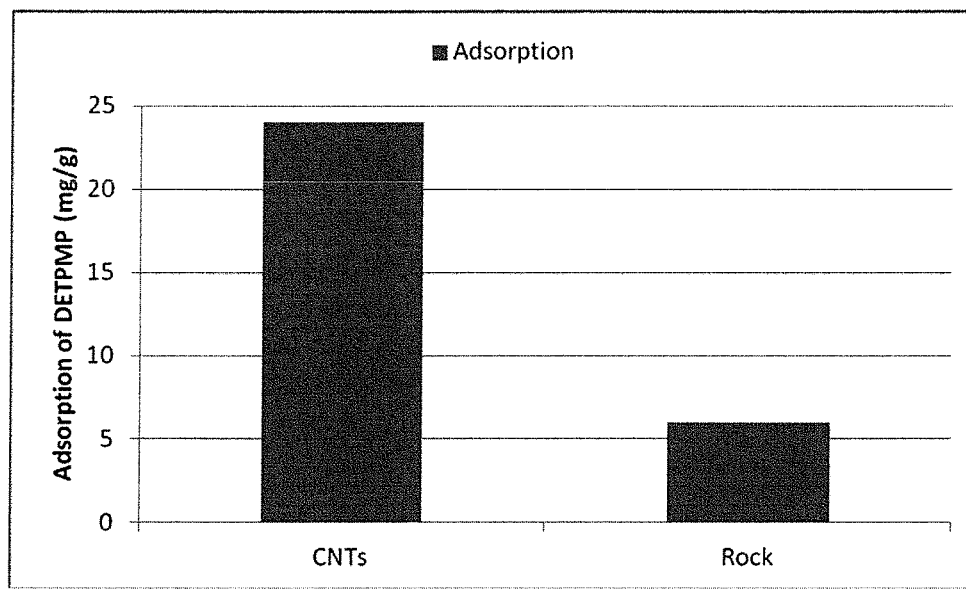
Figure 13:
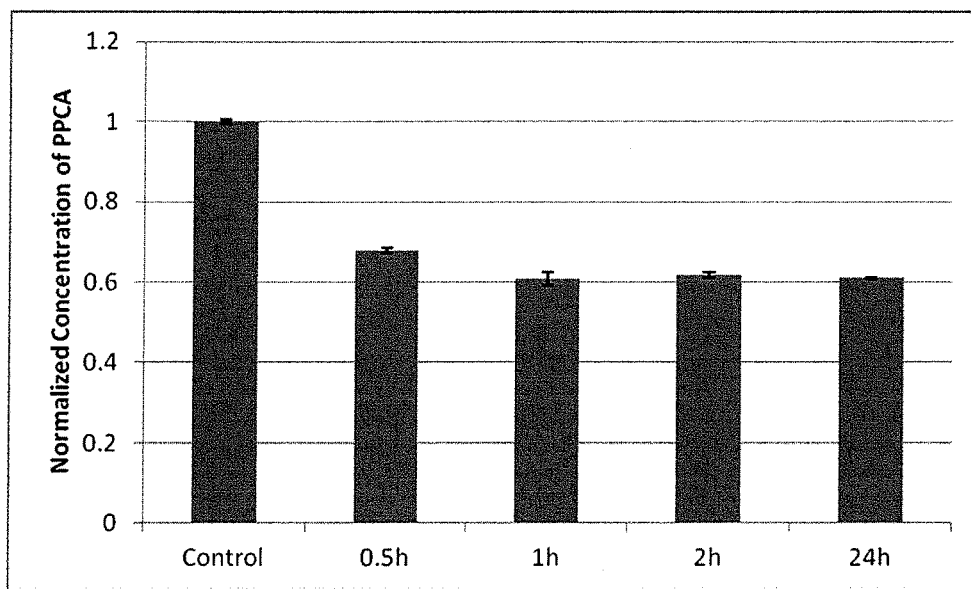
Figure 14:
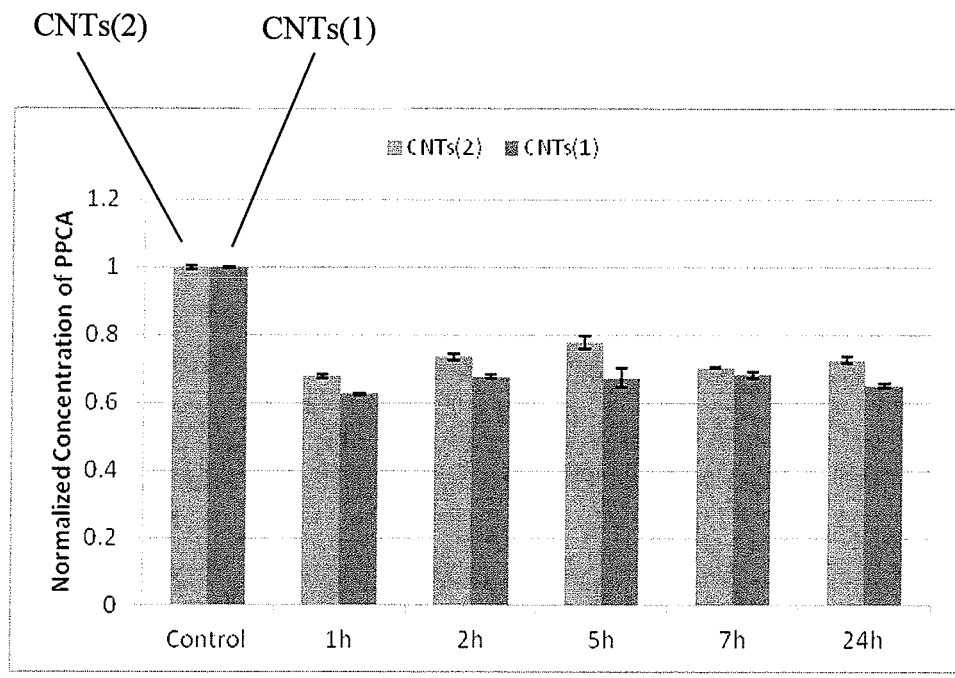
Figure 15:
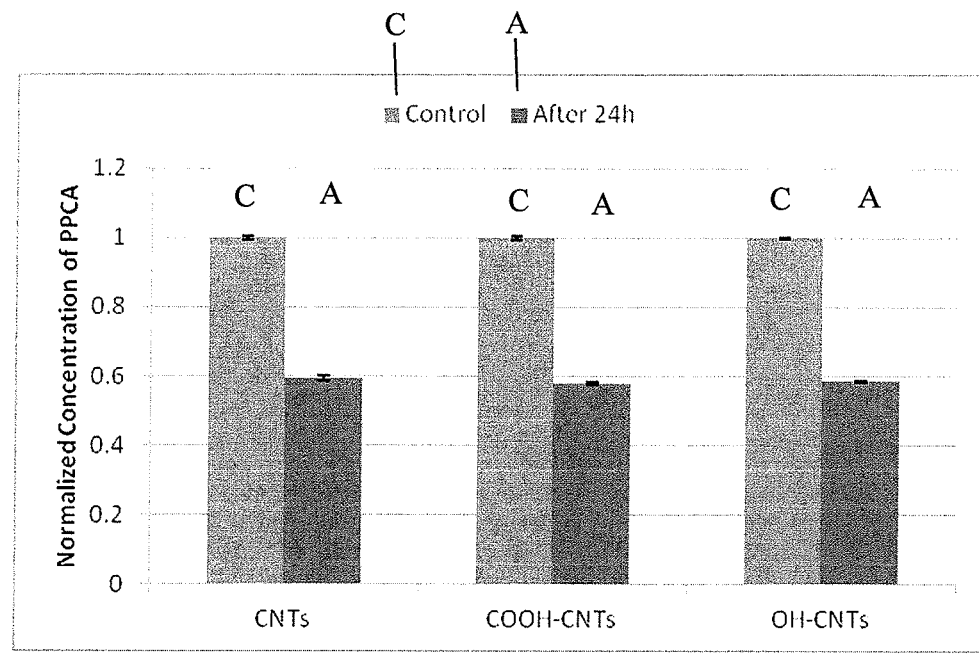
Figure 16:
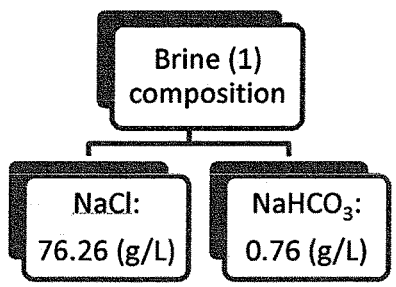
Figure 17:
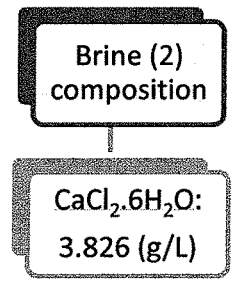
Figure 18:
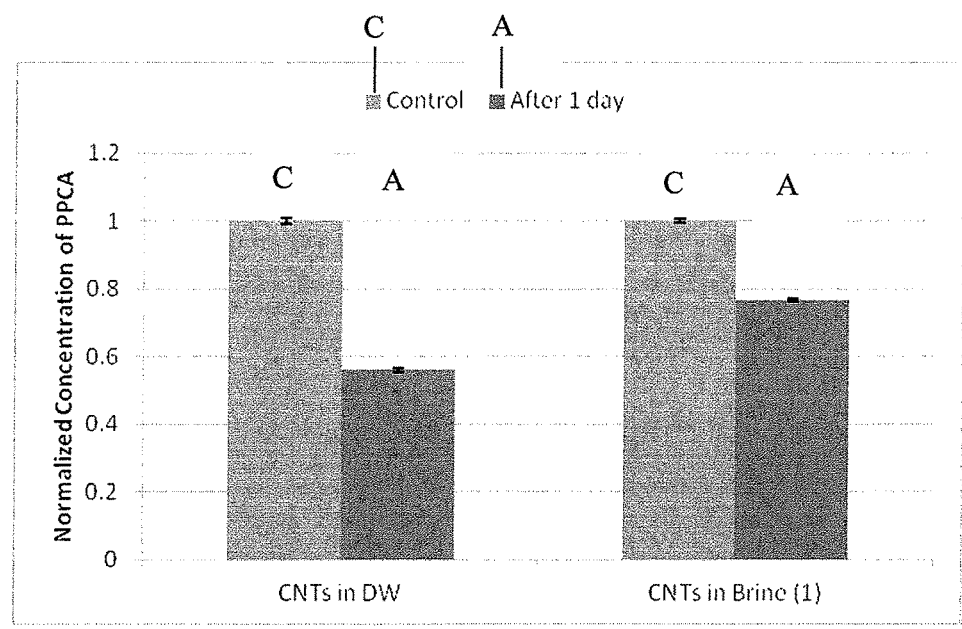
Figure 19:
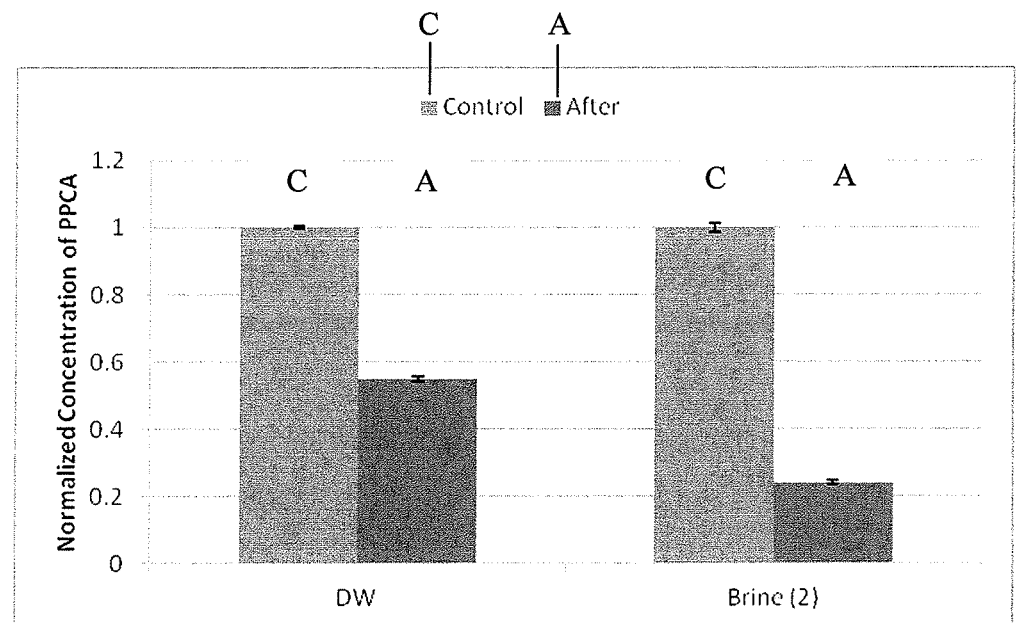
Figure 20:
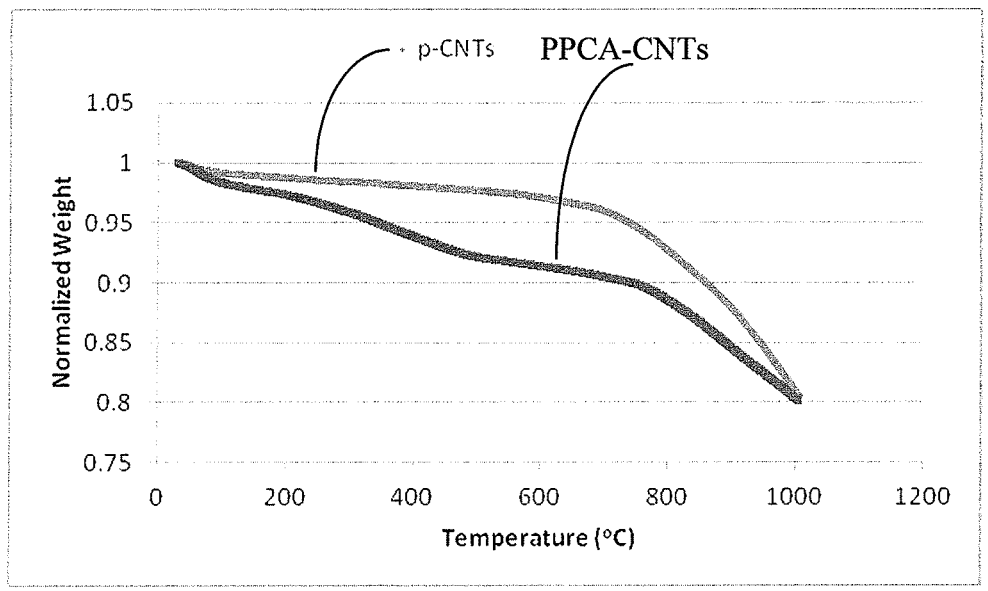
Figure 21:
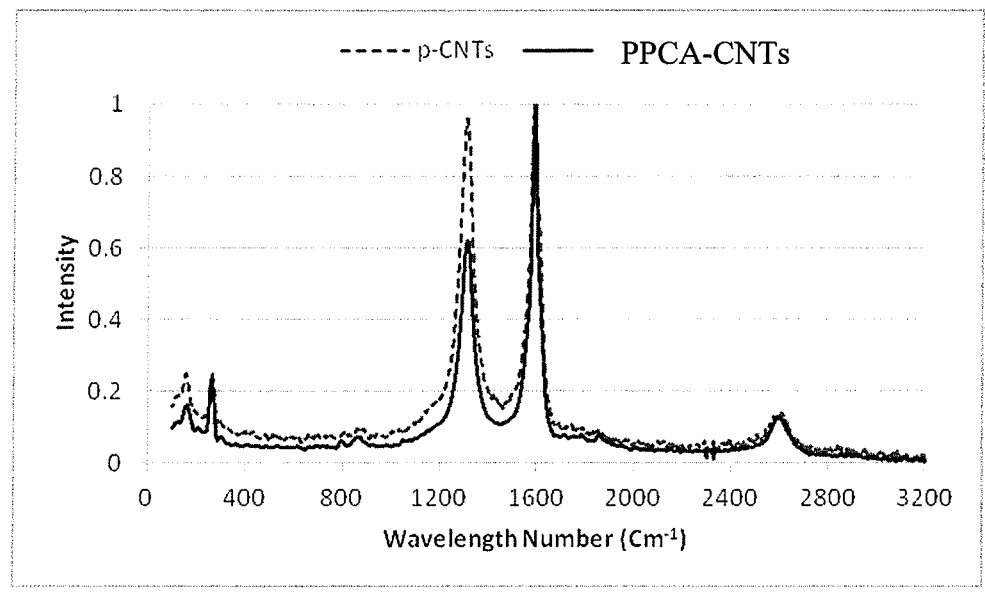
Figure 22:
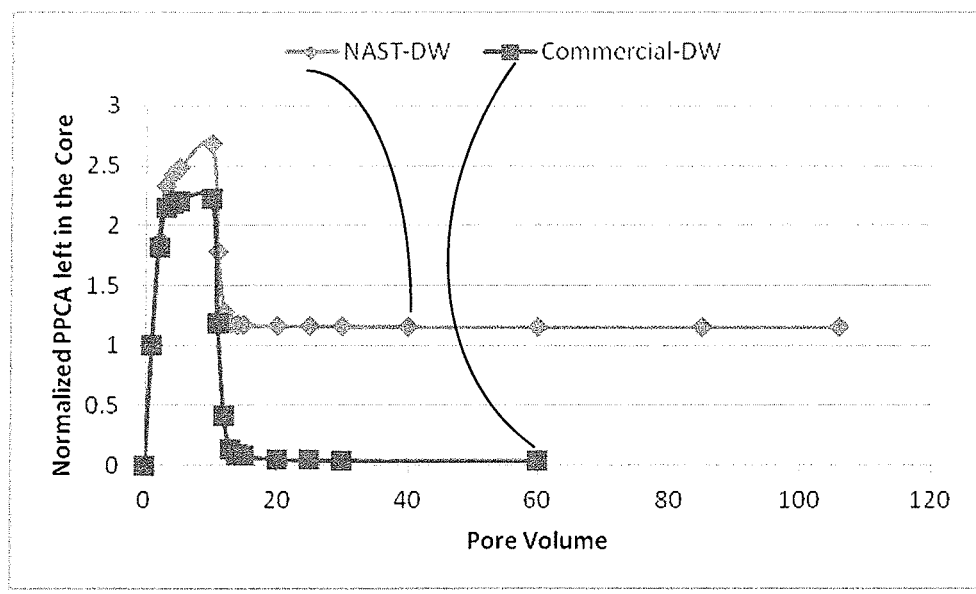
Figure 23:
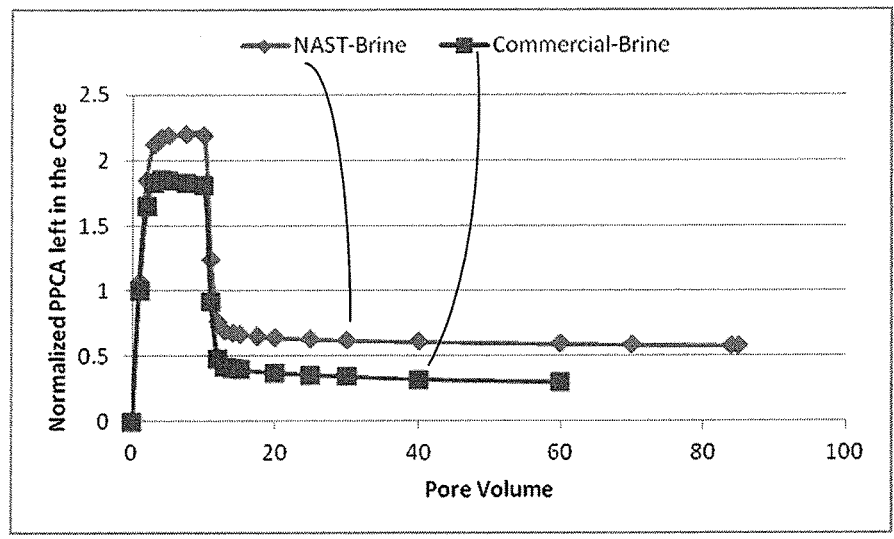

FIG. 6*a* is a scanning electron microscope (SEM) image of a cleaned quartz surface;

FIGS. 6*b* and 6*c* are SEM images of the surface of FIG. 6*a* with an organo-silane binder deposited on the surface;

FIG. 6*d* is an SEM image of the surface of FIG. 6*b* with CNTs adhered to the surface via the binder after the surface has been exposed to a solution containing the CNTs for 1 day;

FIG. 6*e* is an SEM image of the surface of FIG. 6*b* with CNTs adhered to the surface via the binder after the surface has been exposed to a solution containing the CNTs for 7 days;

FIG. 6*f* is an SEM image of carbon nano-tubes adhered to the surface using SDS as a dispersant;

FIG. 7*a* is an SEM image of CNTs adhered to a doddington rock surface by using DMF as a dispersant and DCC as a linking agent;

FIG. 7*b* is an SEM image of CNTs adhered to a doddington rock surface by using SDS as a dispersant and EDC-Sulfo-NHS as a linking agent;

FIG. 8 shows the chemical formula of the scale inhibitors DETPMP and PPCA;

FIG. 9 is a comparison of the adsorption of PPCA on CNTs and three different sands;

FIG. 10 is a comparison of the adsorption of PPCA on CNTs and rock;

FIG. 11 is a comparison of the adsorption of DETPMP on CNTs and silica powder;

FIG. 12 is a comparison of the adsorption of DETPMP on CNTs and rock;

FIG. 13 shows the adsorption of PPCA on CNTs over a 24 hour period;

FIG. 14 is a comparison of the adsorption of PPCA on two different types of CNT;

FIG. 15 shows the normalised concentration of PPCA in solution with CNTs, carboxyl functionalised CNTs and hydroxyl functionalised CNTs;

FIG. 16 shows the composition of brine 1 used in experiments;

FIG. 17 shows the composition of brine 2 used in experiments;

FIG. 18 is a comparison of the adsorption of PPCA in CNTs in distilled water (DW) and brine 1;

FIG. 19 is a comparison of the adsorption of PPCA in CNTs in distilled water (DW) and brine 2;

FIG. 20 shows a thermogravimetric analysis (TGA) of functionalised CNTs and pristine CNTs;

FIG. 21 shows the results of Raman spectroscopy of functionalised CNTs and pristine CNTs;

FIG. 22 shows a coreflood test in distilled water;

FIG. 23 shows a coreflood test in brine; and

Figure 24:
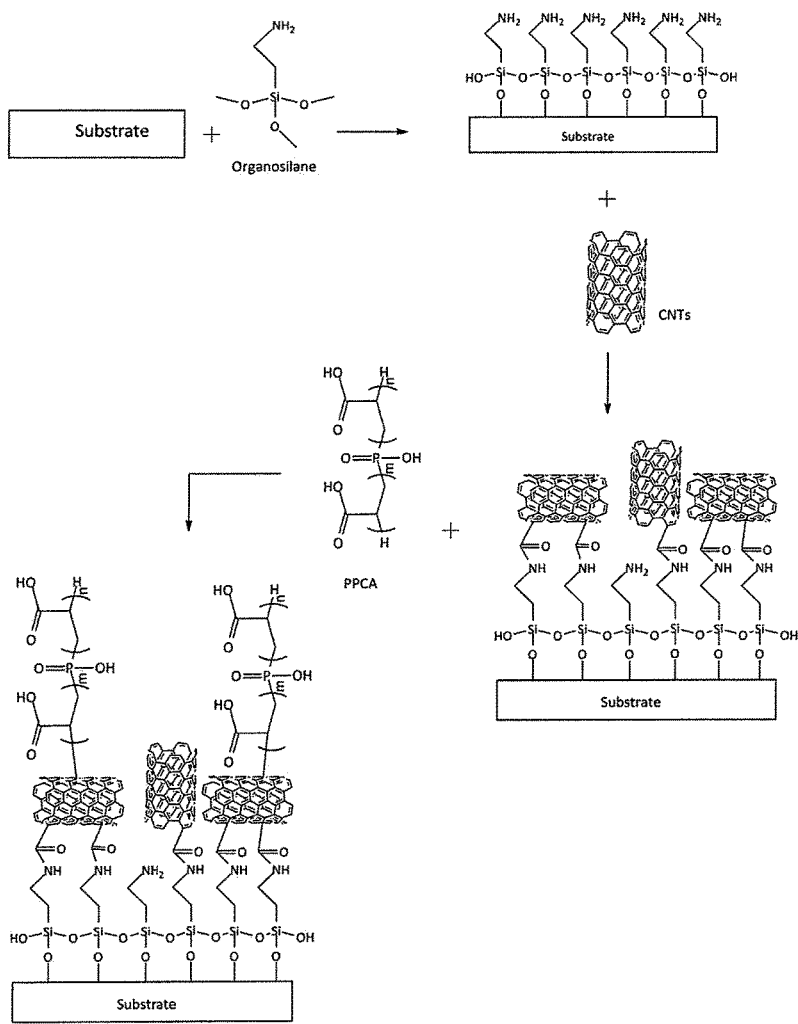

FIG. 24 is a schematic representation of an embodiment of the method of the invention.

The embodiment of the method of inhibiting scale in a geological formation which is illustrated schematically in FIG. 24 and will be described below comprises the steps of:
(a) depositing a 3-aminopropyltriethoxysilane binder on a rock surface of the geological formation;
(b) delivering a nano-material comprising nano-particles which are carboxyl functionalised carbon nano-tubes (CNTs) to the surface of the geological formation whereby to cause adherence by an amide bond between the carboxyl groups on the CNTs and amino groups on the binder, wherein the CNTs provide one or more adsorption sites for a scale inhibitor which is PPCA or DETPMP;
(c) emplacing a quantity of the PPCA or DETPMP in the geological formation so that an amount of the PPCA or DETPMP is adsorbed by the CNTs; and
(d) inhibiting scale in the geological formation by sustained release of the amount of PPCA or DETPMP from the nano-material into the geological formation.

Experiments which relate to the individual steps of this embodiment of the method are described in detail below.

Experiments Relating to Step (a)—Depositing a 3-Aminopropyltriethoxysilane Binder on a Rock Surface The rock surface of the geological formation (labelled as substrate in the Figures) is functionalized by a 3-aminopropyltriethoxysilane binder to modify the rock surface in order to be reactive with the CNTs. 2 wt % of 3-aminopropyltriethoxysilane is added to a binder carrier fluid which is a solution of 95% ethanol to 5% water by volume. The binder and binder carrier fluid mixture is pumped into the geological formation for a desired time varied from 1 hour to 4 hours. The rock surface is flushed by ethanol followed by water to remove the un-reacted organosilane.

A Field-emission gun scanning electron microscope (FEG-SEM) image of a cleaned quartz surface is shown in FIG. 6a. FEG-SEM images of a quartz surface on which 3-aminopropyltriethoxysilane binder has been deposited are shown in FIGS. 6b and 6c.

Experiments Relating to Step (b)—Adhering Carboxyl Functionalised CNTs to the Rock Surface The CNTs used in this embodiment are carboxyl functionalised CNTs (COOH-CNTs) with a length less than 2 μm and a diameter less than 8 nm. The COOH-CNTs bond with the amino group on 3-aminopropyltriethoxysilane binder.

Before pumping CNTs into the rock surface, they are dispersed in a nano-material carrier fluid. Two dispersants, DMF and SDS, were tested.

i. Dispersion of CNTs in Dimethylformamide (DMF)

Figure 1:
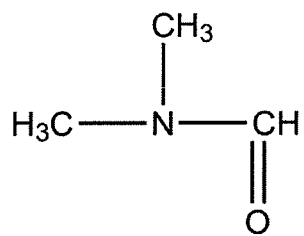
FIG. 1 shows the chemical formula of dimethylformamide (DMF)

The formula of DMF is shown in FIG. 1. DMF is miscible in water and most organic liquids. DMF is adsorbed on to the wall of the CNTs and unwraps the agglomerated CNTs with the assistance of an ultrasonic bath and the physisorption interaction between DMF and the CNTs.

The COOH-CNTs were added to the DMF solution in a ratios of 1:5 (wt./v), followed by putting the beaker in an ultrasonic bath for 2 h. The solution was then left static for 24 h to precipitate the un-dispersed CNTs to the bottom of the beaker. The upper suspension was used in experiments.

ii. Dispersion of CNTs in Sodium Dodecyl Sulfate (SDS)

Figure 2:
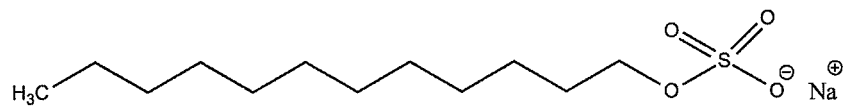
FIG. 2 shows the chemical formula of sodium dodecyl sulfate (SDS)

Another dispersant chosen for this work was SDS. The formula of SDS is shown in FIG. 2. SDS is more environmentally friendly than DMF. The amount of dispersion of CNTs changes depending on the dispersant used. SDS disperses CNTs by the hydrophobic tail of the SDS interacting with the CNTs, and the hydrophilic head of the SDS bonding simultaneously with water. An ultrasonic bath was used to unbundle the agglomerated CNTs when SDS is targeting the CNTs.

Two varying ratios of COOH-CNTs/SDS (1:10 and 1:50, wt./wt.) were applied to obtain the best dispersion. The solution was put in an ultrasonic bath for 2 h, followed by stirring for 24 h. The solution was left in order to separate the non-dispersed COOH-CNTs from the dispersed ones.

For these two different methods of dispersing CNTs (using DMF or SDS), a suitable linking agent was chosen to facilitate the reaction of the carboxyl group of the COOH-CNTs with the amino group of the 3-aminopropyltriethoxysilane treated rock surface. N,N'-Dicyclohexylcarbodiimide (DCC) was chosen as a linking agent for the DMF dispersed COOH-CNTs. 1-Ethyl-3-(3-dimethylaminopropyl)carbodiimide (EDC) was chosen for the SDS dispersed COOH-CNTs.

Figure 3:
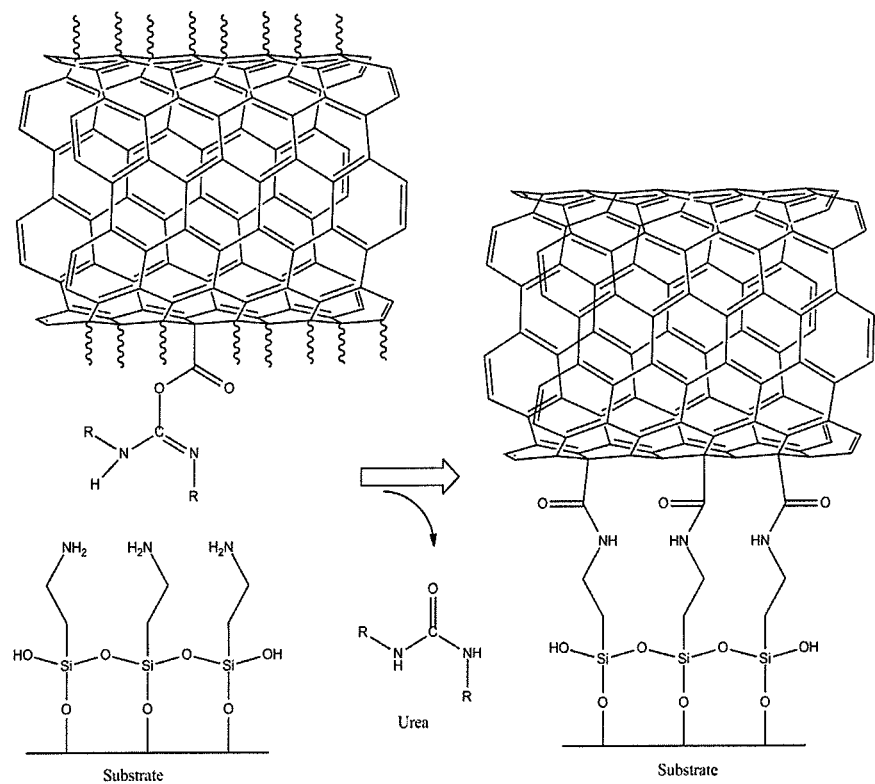
FIG. 3 shows the chemical interaction between a functionalised nano-material comprising carbon nano-tubes (CNTs) and an organo-silane binder deposited on a substrate surface.

Experiments were carried out on quartz and doddington rock surfaces. An organosilane-functionalised quartz or doddington rock sample was embedded in a 25 ml beaker, followed by adding 5 ml of DMF or SDS dispersed COOH-CNTs. Samples were left in the solutions for desired times. Following that, the sample was rinsed with distilled water (DW) and then dried at room temperature. After drying, the samples were taken for characterization by a field-emission gun scanning electron microscope (FEG-SEM).

iii. Adhering DMF Dispersed COOH-CNTs to Organosilane Treated Quartz/Rock Surface Using DCC as a Linking Agent FIG. 3 shows the chemical interaction between DMF dispersed COOH-CNTs and the organosilane treated substrate using DCC as a linking agent.

Figure 4:
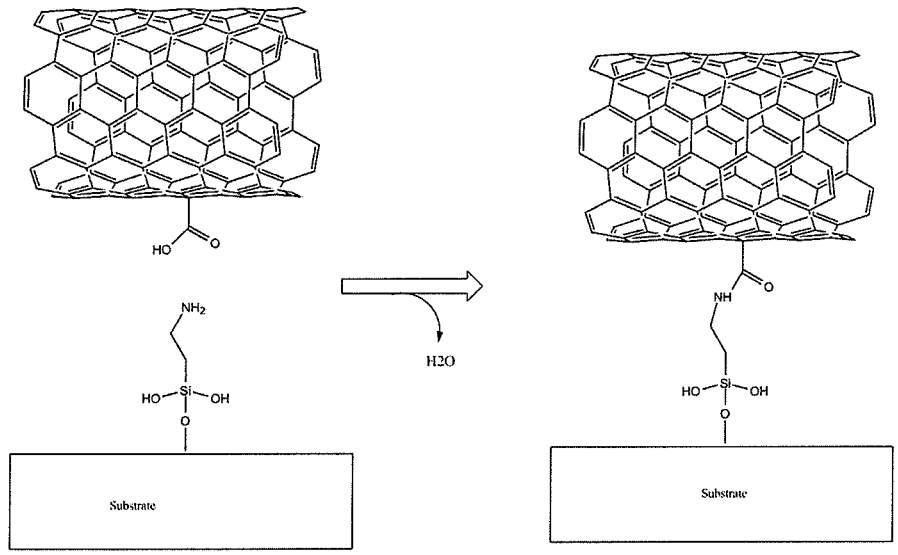
FIG. 4 shows the chemical interaction between a carboxyl functionalised nano-material comprising carbon nano-tubes and an organo-silane binder deposited on a substrate.

First, 5 ml of DMF was added to a beaker with 1 mg COOH-CNTs. The solution was shaken by hand to disperse the COOH-CNTs. For better and uniform dispersion, an ultrasonication bath was applied for 2 h to disperse the COOH-CNTs into the DMF solution. After that, 3 mg DCC was added to the solution, followed by embedding an organosilane functionalised quartz coupon into the solution for fixed durations. Two different durations (1 and 7 days) were used in this work. The results were imaged by FEG-SEM after drying the surface and are shown in FIG. 6d (after 1 day) and FIG. 6e (after 7 days).

iv. Adhering SDS Dispersed COOH-CNTs on Organosilane Treated Quartz/Rock Surface without Using a Linking Agent FIG. 4 shows the chemical interaction of SDS dispersed COOH-CNTs with the amine group of organosilane-functionalised quartz without the presence of a linking agent.

Figure 5:
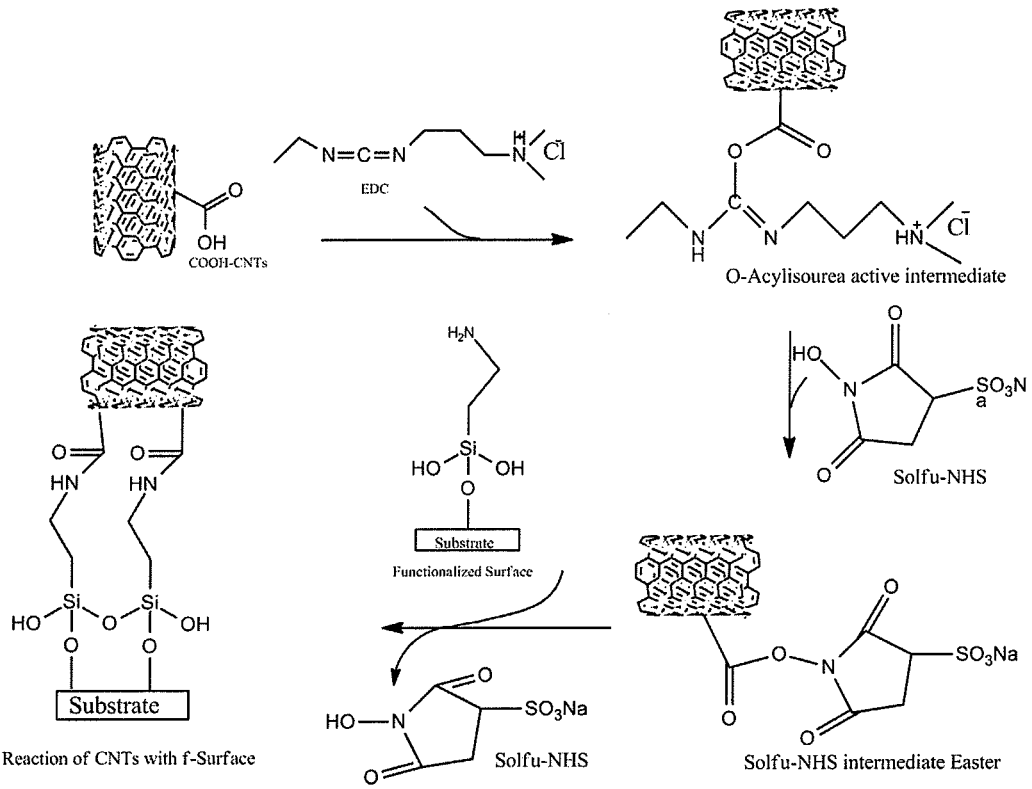
FIG. 5 shows the use of 1-ethyl-3-(3-dimethylaminopropyl)-carbodiimide (EDC) and hydroxysulfosuccinimide (sulfo-NHS) to promote the chemical interaction between a nano-material and a binder deposited on a substrate.

The treated surface was embedded in the 5 ml solution of SDS/CNTs for desired times followed by rinsing with distilled water. It was found that the likelihood of reaction between COOH-CNTs and amines on a functionalised surface is low in the absence of a linking agent v. Adhering SDS Dispersed COOH-CNTs to Organosilane Treated Quartz/Rock Surface Using EDC as a Linking Agent and Sulfo-NHS as a Cross-Linking Promoter FIG. 5 shows the chemical interaction of SDS dispersed COOH-CNTs with the amine group of organosilane-functionalised quartz using EDC as a linking agent. The EDC acts as a conjugation compound to increase reactivity and Solfu-NHS is used as a cross-linking promoter.

To use EDC to crosslink the carboxylic groups of CNTs with amine on the surface, the following protocol was applied:
1. A solution with 10 mg COOH-CNTs in SDS was prepared in an ultrasonic bath for 2 h.
2. After that, 1.644 mg EDC was added to the above solution.
3. After mixing the solution, 1.086 g Sulfo-NHS was added, and the solution was shaken by hand before being used in experiments.

FIG. 6f shows an SEM image of SDS dispersed COOH-CNTs adhered to organosilane treated quartz using EDC as a linking agent and sulfo-NHS as a cross-linking promoter.

vi. Adhering COOH-CNTs to Organosilane Treated Doddington Rock Surface

Using the methods above, COOH-CNTs were adhered to samples of doddington rock. FIG. 7a shows COOH-CNTs adhered to doddington rock using DMF and DCC. FIG. 7b shows COOH-CNTs adhered to doddington rock using SDS, EDC and Sulfo-NHS.

Experiments Relating to Step (c)—Adsorbing Scale Inhibitor to the CNTs

Static adsorption tests have been performed to assess the efficiency of CNTs to adsorb Poly Phosphino Carboxylic Acid (PPCA) and Diethylenetriamine Penta Methylene Phosphonic Acid (DETPMP). The chemical structure of PPCA and DETPMP is shown in FIG. 8.

It is assumed that the carbon atoms of PPCA are able to adsorb to the carbon atoms in CNTs.

Adsorption tests were performed in distilled water and two different compositions of brine solution. The composition of Brine 1 is shown in FIG. 16 and the composition of Brine 2 is shown in FIG. 17.

The static adsorption tests were performed as follows. 50 ml solutions of various concentrations of the scale inhibitors (SI) and distilled water (DW) or brine were prepared every time for the experiments. Three samples were sent for Inductively Coupled Plasma (ICP) measurement to determine the concentration of SI in the solution as a control. After that, a desired amount of CNTs (or silica or rock for comparison) were added to the solution which was stirred for 24 h. Alternatively, the solution was put in an ultrasonic bath for 2 h and then stirred by magnetic bar for 22 h. Then 3 ml of solution were filtered by 0.45 µm syringe filter (Millex-HV 0.45 µm Millipore) and measured by ICP (Horiba Jobin Yvon, Instruments S.A.). Therefore, whole solution is filtered by vacuum pump and CNTs were collected on the top of membrane. At the end, functionalised CNTs were dried in vacuum oven at 70° C. for 4 h and analysed by Thermogravimetric Analysis (TGA) and Raman spectroscopy.

i. Adsorption of PPCA on CNTs Compared to Sands

FIG. 9 shows the normalized adsorption of PPCA on the CNTs and various types of sands (labelled as A) when compared with a control (labelled as C). The y-axis of FIG. 9 shows the concentration of PPCA remaining in solution. FIG. 9 shows a higher adsorption of PPCA on CNTs than the adsorption on rock, silica powder or porous silica particles because less PPCA remains in solution after 24 h of exposure to the CNTs when compared with the results for rock, silica powder and porous silica particles. Less PPCA in solution means that more PPCA has been adsorbed to the sample. These results illustrate that a high adsorption is achievable by CNTs. Previously, less than 1 mg/g PPCA adsorption has been obtained in a condition of a calcium containing brine and using kaolinite as an adsorbent at 95° C.

ii. Adsorption of PPCA on CNTs Compared to Crushed Rock

FIG. 10 indicates that less than 1 mg adsorption of PPCA per gram of crushed rock has been achieved previously with a calcium containing brine. In comparison, at least 70 mg of PPCA is adsorbed per gram of CNTs. This shows that CNTs have a far greater capacity to adsorb PPCA than crushed rock.

iii. Adsorption of DETPMP on CNTs

Another scale inhibitor used in the oil and gas industry is DETPMP. The adsorption of DETPMP on CNTs was investigated. The experimental set-up for DETPMP used the same protocol as the PPCA experiments.

FIG. 11 shows a comparison result of DETPMP adsorption on CNTs and silica powder (labelled as A) when compared with a control (labelled as C). FIG. 11 shows no adsorption of DETPMP on silica powder after 24 h. 7.1 mg out of 76 mg DETPMP dissolved in 50 ml DW adsorbed on the CNTs' surface which is not as much as adsorption of PPCA on CNTs.

FIG. 12 shows a comparison between the adsorption of DETPMP on CNTs and adsorption on rock from previous experiments. Again it is noteworthy that the experiment on the rock was carried out in a solution of brine containing calcium and other divalent ions. This result indicates that the affinity of DETPMP being adsorbed on the surface of CNTs is much higher than on the rock due to higher specific surface area of CNTs (in $m^2/g$) and also the tendency of carbon atom of CNTs to adsorb DETPMP.

iv. Rate of Adsorption of PPCA on CNTs

FIG. 13 shows the rate with which PPCA is adsorbed on to CNTs. Samples for ICP measurement were taken at various times to observe the trend of adsorption. 300 mg CNTs were added to a solution of 1000 ppm PPCA. Samples were taken before adding CNTs and at various times after adding the CNTs. FIG. 13 illustrates the normalized adsorption of PPCA on CNTs over time by showing the normalised concentration of PPCA remaining in solution. Samples were taken after 0.5, 1, 2 and 24 h. FIG. 13 indicates that after 0.5 h, 82% of reachable adsorption was obtained and after 1 h adsorption of PPCA on CNTs reached an equilibrium. This is significantly faster than the 24 h well shut-in time required for some current scale inhibitor squeeze treatments and shows that step (c) of the present invention may advantageously be faster than known methods.

v. Influence of Defects in CNTs on Adsorption of PPCA

CNTs are available in the market with different qualities and structures. Two different types of CNTs with different qualities were compared in order to understand the influence of the quality of CNTs to adsorb PPCA as a scale inhibitor. 300 mg of each type of CNTs were added into two solutions of 1000 ppm PPCA in DW and were sampled at various times.

FIG. 14 shows the normalized concentration of PPCA in the solution over the sample times. The left-hand columns in FIG. 14 represent a second type of CNTs (labelled as CNTs (2)) which have a higher purity (a more perfect wall) and the right-hand column represents the first type of CNTs (labelled as CNTs (1)) which were used in the previous experiments. CNTs (1) have more defects in the wall of the carbon nano tubes than CNTs (2). CNTs (1) and CNTs (2) have 95% and 99% purity, respectively.

FIG. 14 indicates that the adsorption of PPCA on both types of CNTs reaches to equilibrium after 1 h. It also shows higher adsorption by CNTs (1) at 2 h, 5 h, 7 h and 24 h. This may be due to the lower quality CNTs (1) having more defects on the wall of the CNTs which provide more active adsorption sites for PPCA.

vi. Adsorption of PPCA on CNTs with Different Functional Groups

FIG. 15 shows PPCA adsorption on different functionalized CNTs (f-CNTs) after 24 h (labelled as A) when compared with a control (labelled as C). Two different f-CNTs were compared with unfunctionalised CNTs. The f-CNTs were COOH-CNTs and hydroxyl functionalized CNTs (OH-CNTs). FIG. 15 shows similar adsorptions of PPCA on all three types of CNT. This indicates that adhering f-CNTs such as COOH-CNTs to the surface of a geological formation would not decrease the adsorption of PPCA on the COOH-CNTs when compared with unfunctionalised CNTs.

vii. Effect of Brine on Adsorption of PPCA

All the above experiments were performed in DW to eliminate the effects of ions in solution. Since the method may be performed in a geological formation in which brine may be present in the fluid environment within the pores of the geological formation, experiments were run in two brine solutions.

Two basic brines were selected. The composition of Brine 1 is shown in FIG. 16 (in grams per liter of water). The composition of Brine 2 is shown in FIG. 17. A comparison of the compositions of Brine 1 and Brine 2 is given in Table 1 below.

TABLE 1

Comparison of composition of Brines 1 and 2

| | NaCl (g/l) | NaHCO$_3$ (g/l) | CaCl$_2$•6H$_2$O (g/l) |
|---|---|---|---|
| Brine 1 | 76.26 | 0.76 | 0 |
| Brine 2 | 0 | 0 | 3.826 |

300 mg of CNTs were added into 1000 ppm PPCA in DW and brine solutions. The result is shown in FIGS. 18 and 19.

FIG. 18 shows the concentration of PPCA after 1 day (labelled as A) when compared with a control (labelled as C). FIG. 18 shows a 47% decrease in adsorption of PPCA on CNTs in brine (1) compared with DW. The decrease in adsorption can be explained by the increased salinity of the solution which decreases the affinity of the PPCA to adsorb to the CNTs. Brine (1) contains no calcium.

FIG. 19 shows the concentration of PPCA after 1 day (labelled as A) when compared with a control (labelled as C). FIG. 19 shows the difference in adsorption of PPCA on CNTs in DW compared with brine (2). Brine (2) contains calcium in order to observe the effect of calcium ions on adsorption. Unfunctionalised CNTs were used in this test because FIG. 15 shows the adsorption behaviour of different types of CNTs is similar. FIG. 19 indicates a 30% increase on adsorption of PPCA on CNTs in the presence of calcium.

viii. Thermogravimetric Analysis of CNTs

FIG. 20 shows the mass loss of CNTs which have adsorbed PPCA (labelled as PPCA-CNTs) compared with pristine CNTs which have not adsorbed PPCA (labelled as p-CNTs) under TGA in a N$_2$ atmosphere at ambient pressure. The mass loss was measured from 0 to 1000° C. PPCA-CNTs and p-CNTs were heated up to 1000° C. with a temperature rate of 10° C./min in the TGA. Samples were dried in a vacuum oven at 70° C. for 4 h before use in the TGA.

At the beginning in FIG. 20, both samples follow the same trend of losing weight as it is believed that it would be mostly moisture evaporating. From 50° C. to almost 700° C. the development of weight loss is faster in the PPCA-CNTs which may be due to the PPCA being removed from the CNTs. From 700° C. onwards the trend is similar again as the CNTs themselves start to decompose.

It is notable that the mass loss versus the temperature is different for PPCA-CNTs and p-CNTs. Mass loss occurs at lower temperatures for the PPCA-CNTs. Although TGA is not able to give us an accurate mass loss, it was attempted to compare the TGA results with ICP. The difference in mass loss between p-CNTs and PPCA-CNTs up to 700° C. was used for the calculation because above 700° C. the CNTs begin to decompose. The normalized weight loss difference between p-CNTs and PPCA-CNTs for up to 700° C. is 0.0572 from FIG. 20. This is equivalent to 0.62118 mg for 10.8598 mg of PPCA-CNTs used in the pan of TGA. Moreover, 300 mg CNTs were used in the experiment which makes the amount of weight loss to 17.44 mg. With converting this value to (mg/l), 348.9 (mg/l) of adsorption of PPCA on the PPCA-CNTs is calculated by TGA which is in a good agreement with the ICP result with 346 (mg/l).

ix. Raman Spectroscopy of CNTs

Raman spectroscopy is used to study and to characterize graphite materials such as carbon nanotubes and fullerenes. Different features of CNTs are characterized by Raman spectroscopy including the G-band which is the common sp$^2$ carbon forms and corresponds to the tangential vibration of carbon atoms. D and G' bands correspond to disorder and dispersive carbon atoms, respectively. The radial breathing mode (RBM), where carbon atoms move in the radial direction, is more sensitive to the carbon nanotubes diameter. Raman spectroscopy was performed to analyse the vibrational, rotational and other low-frequency modes of PPCA-CNTs and p-CNTs.

FIG. 21 shows the normalized intensity of Raman spectroscopy for PPCA-CNTs and p-CNTs. All samples were emplaced on a metal surface. The dashed spectrum represents CNTs which have not adsorbed PPCA (p-CNTs). The solid spectrum represents CNTs which have adsorbed PPCA (PPCA-CNTs).

In FIG. 21, the values of 2600, 1590, 1310 and 266 & 160 cm$^{-1}$ correspond to the G', G, D-band and RBM in p-CNTs and PPCA-CNTs, respectively. The intensity ration $I_D/I_G$ has changed from 0.62 to 0.96 from p-CNTs to PPCA-CNTs which shows a 1.55 increment of ratio of D-band to G-band. This illustrates more defects on the CNTs after being functionalized and after adsorption of PPCA which indicates that a covalent bonding occurred during functionalisation. Both p-CNTs and PPCA-CNTs showed a small peak at 2600 cm$^{-1}$ which represents G'-band.

Since RBM is believed to be a unique characteristic of Single-Walled Carbon Nanotubes (SWCNTs), RBM peaks may not show on Raman spectroscopy of Multi-Walled Carbon Nanotubes (MWCNTs). But it is understood that with a good resonance condition, RBM of MWCNTs can be observed by Raman spectroscopy if the CNTs have a small diameter inner tube (less than 2 nm diameter). Usually the RBM signal of the outer wall diameter is too weak to be peaked and the signal of inner wall diameter is often scattered. As the diameter of MWCNTs being used in this research is small and less than 8 nm the chance of characterizing of the RBM signal is high. Hence FIG. 21 shows two peaks at 266 and 160 cm$^{-1}$ for both samples which correspond to RBM. It can be seen that the second peak of RBM (160 cm$^{-1}$) is a little shorter for PPCA-CNTs. After adsorption of PPCA on CNTs the diameter of CNTs may increase slightly and this might affect the signal of RBM.

Experiments Relating to Step (d)—Sustained Release of the Scale Inhibitor into the Geological Formation Coreflood tests were carried out to evaluate the method and combine all the steps together. In the oil and gas industry, coreflood tests are performed before squeezing a well to predict the behaviour of the well. Therefore the results of the coreflood tests may indicate the suitability of the method.

Doddington rock was cored and used in the coreflood tests. The coreflood tests were carried out in both DW and brine. In both the DW and brine tests, a method relating to the present invention was compared against a simple squeeze treatment method which is available commercially.

i. Commercial Method for Coreflood Test

The procedure for the commercial method was as follows:
1. 10 pore volumes (PV) of solution of PPCA and DW or Brine was injected into the core and samples were taken at effluent for ICP to quantify the outcome concentrations.
2. The core was shut for 24 h in order to enable PPCA to be adsorbed directly on the surface of the rock.
3. Background solution (DW or Brine) was pumped into the core and effluent samples were taken for ICP measurement of PPCA concentration at desired times.

The flow rate for injecting the solutions was 1 ml/min.

ii. Method Relating to the Present Invention for Coreflood Test

The procedure for the method relating to the present invention was as follows:
1. 10 PV of 2 wt % 3-aminopropyltriethoxy silane in a solution of ethanol/DW (95%/5% v/v) was injected into the core followed by shutting the core for 2 h.
2. The core was flushed with 5 PV ethanol to remove un-reacted organosilane form the core followed by rinsing with 5 PV DW.
3. 10 PV of dispersed COOH-CNTs in DMF with DCC (or in SDS with EDC/Sulfo-NHS) was subsequently injected into the core followed by shutting the core for 24 h.
4. The core was afterwards rinsed with 10 PV DW.
5. Solution of PPCA and DW was then injected into the core to be adsorbed by the COOH-CNTs and samples were taken at effluent for ICP measurements followed by 24 h shut-in.
6. Post-flush was carried out with background solution (DW or Brine) and effluent samples were taken for ICP measurement of PPCA concentration at desired times.

The flow rate for injecting the solutions was 1 ml/min.

iii. Results of the Coreflood Tests

The results of the coreflood tests are illustrated in FIG. 22 and FIG. 23.

FIG. 22 compares the performance in distilled water (DW) of the method relating to the present invention described at ii. above (labelled NAST-DW) with the commercial method described at i. above (labelled Commercial-DW). In step 3 of the method relating to the present invention the COOH-CNTs were dispersed in DMF with DCC.

The y-axis of FIG. 22 shows the mass of PPCA left in the core. The x-axis shows the fluid flow through the core in terms of multiples of the pore volume of the core. The injection of PPCA into the core is from 0 to 10 pore volumes. After 10 pore volumes no more PPCA is injected and DW is flushed through the core.

It can be observed that after 15 pore volumes of fluid flow the amount of PPCA remaining in the core approaches zero for the known commercial method. In a hydrocarbon reservoir this would indicate that a further squeeze treatment would be required once 5 pore volumes of flow had occurred after the well had been re-opened after the first squeeze treatment. In comparison even after 100 pore volumes of fluid flow the amount of PPCA remaining in the core is high with the method relating to the present invention. This demonstrates the sustained release of the amount of the scale inhibitor into the geological formation.

FIG. 23 compares the performance in brine of the method relating to the present invention described at ii. above (labelled NAST-Brine) with the commercial method described at i. above (labelled Commercial-Brine). In step 3 of the method relating to the present invention the COOH-CNTs were dispersed in SDS with EDC/Sulfo-NHS.

FIG. 23 shows the amount of PPCA remaining in the core by the method relating to the present invention is higher over a fluid flow of greater than 80 pore volumes when compared with the Commercial-Brine method. It also shows that the amount of remained PPCA in the core is decrease compared with FIG. 22. This may be due to the different dispersant and linking agent used when compared with FIG. 22.

The invention claimed is:

1. A method of inhibiting scale in a geological formation comprising:
    (a) depositing an organosilane on a surface of the geological formation;
    (b) delivering a nano-material comprising carboxy-functionalised multi-wall carbon nanotubes or fullerene to the surface of the geological formation whereby to cause adherence by a chemical interaction between the nano-material and the organosilane, wherein the nano-material provides one or more adsorption sites for a polycarboxylic acid-based scale inhibitor;
    (c) emplacing a quantity of the polycarboxylic acid-based scale inhibitor in the geological formation so that an amount of the polycarboxylic acid-based scale inhibitor is adsorbed by the nano-material; and
    (d) inhibiting scale in the geological formation by sustained release of the amount of the polycarboxylic acid-based scale inhibitor from the nano-material into the geological formation.

2. The method as claimed in claim 1, wherein the nano-material comprises carbon nanotubes having a linear dimension in the range from 0.5 nm to 2000 nm.

3. The method as claimed in claim 1, wherein the nano-material comprises carbon nanotubes including one or more defects.

4. The method as claimed in claim 1, wherein the organosilane chemically bonds to the geological formation when it is deposited on the surface of the geological formation.

5. The method as claimed in claim 1, wherein the organosilane is a binder.

6. The method as claimed in claim 1, wherein the organosilane has an amino group.

7. The method as claimed in claim 1, wherein the chemical interaction between the nano-material and the organosilane is a chemical bond.

8. The method as claimed in claim 7, wherein the chemical bond between the nano-material and the organosilane includes an amide bond.

9. The method as claimed in claim 1, wherein the polycarboxylic acid-based scale inhibitor is polyphosphinocarboxylic acid or diethylenetriamine-penta-methylene phosphonic acid.

10. The method as claimed in claim 1, wherein step (c) comprises the sub-steps:
- (c)(i) pumping the quantity of the polycarboxylic acid-based scale inhibitor into the geological formation via a well;
- (c)(ii) shutting in the well until the amount of the scale inhibitor is adsorbed by the nano-material; and
- (c)(iii) re-opening the well.

11. The method as claimed in claim 1, further comprising:
- (e) emplacing a further quantity of the polycarboxylic acid-based scale inhibitor in the geological formation so that a further amount of the polycarboxylic acid-based scale inhibitor is adsorbed by the nano-material.

12. The method as claimed in claim 11, further comprising:
- (f) inhibiting scale in the geological formation by sustained release of the further amount of the polycarboxylic acid-based scale inhibitor from the nano-material into the geological formation.

13. A kit of parts for performing the method as claimed in claim 1, the kit of parts comprising:
- an organosilane;
- a nano-material comprising carboxy-functionalised multi-wall carbon nanotubes or fullerene capable of adhering to the organosilane by a chemical interaction between the nano-material and the organosilane wherein the nano-material provides one or more adsorption sites; and
- a polycarboxylic acid-based scale inhibitor capable of adsorbing to the adsorption sites on the nano-material.

14. A kit of parts as claimed in claim 13, wherein the nano-material is carbon nanotubes.

15. The method as claimed in claim 1, wherein the carbon nanotubes comprise nano-particles which have a linear dimension in the range from 0.5 nm to 2000 nm.

16. The method as claimed in claim 15, wherein the nano-particles include one or more defects.

17. A method of inhibiting scale in a geological formation as claimed in claim 1, wherein the nano-material is carbon nanotubes.

* * * * *